United States Patent
Willmott et al.

(10) Patent No.: US 10,558,178 B2
(45) Date of Patent: Feb. 11, 2020

(54) CENTRAL PLANT CONTROL SYSTEM WITH LINEAR SOLVER FOR COMPUTATION REDUCTION

(71) Applicant: Johnson Controls Technology Company, Auburn Hills, MI (US)

(72) Inventors: Graeme Willmott, West Milwaukee, WI (US); Matthew J. Asmus, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 7 days.

(21) Appl. No.: 16/039,076

(22) Filed: Jul. 18, 2018

(65) Prior Publication Data

US 2019/0032947 A1    Jan. 31, 2019

Related U.S. Application Data

(60) Provisional application No. 62/537,793, filed on Jul. 27, 2017.

(51) Int. Cl.
*G05B 13/02*   (2006.01)
*F24F 11/64*   (2018.01)
(Continued)

(52) U.S. Cl.
CPC ............ *G05B 13/026* (2013.01); *F24F 11/46* (2018.01); *F24F 11/54* (2018.01); *F24F 11/64* (2018.01);
(Continued)

(58) Field of Classification Search
CPC .. F24F 11/30; F24F 11/46; F24F 11/52; F24F 11/56; F24F 11/63; F24F 11/64;
(Continued)

(56) References Cited

U.S. PATENT DOCUMENTS 8,903,554 B2    12/2014  Stagner
9,982,903 B1 *   5/2018  Ridder ..................... F24F 11/30
(Continued)

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
(Continued)

*Primary Examiner* — Crystal J Barnes-Bullock
(74) *Attorney, Agent, or Firm* — Foley & Lardner LLP

(57) ABSTRACT

Systems and methods for predicting a plurality of thermodynamic states of a plurality of heat, ventilation, and air conditioning (HVAC) devices of an energy plant are disclosed. The system includes a processor and a non-transitory computer readable medium storing instructions when executed causing the processor to: obtain plant netlist data describing the plurality of HVAC devices of the energy plant and connections of the plurality of HVAC devices to corresponding nodes; identify, from the first reduced subset, a second reduced subset of the plurality of thermodynamic states to be predicted by propagating a known value of the plurality of thermodynamic states using a linear solver; predict the second reduced subset of the plurality of thermodynamic states using a non-linear solver; and determine the plurality of thermodynamic states of the energy plant at the plurality of nodes based on the predicted second reduced subset of the plurality of thermodynamic states.

20 Claims, 11 Drawing Sheets

(51) Int. Cl.
| | |
|---|---|
| *G06F 17/16* | (2006.01) |
| *F24F 11/54* | (2018.01) |
| *F24F 11/46* | (2018.01) |
| *G06F 17/10* | (2006.01) |
| *F24F 140/50* | (2018.01) |
| *F24F 140/60* | (2018.01) |
| *F24F 140/00* | (2018.01) |

(52) U.S. Cl.
CPC .............. *G06F 17/10* (2013.01); *G06F 17/16* (2013.01); *F24F 2140/00* (2018.01); *F24F 2140/50* (2018.01); *F24F 2140/60* (2018.01); *G05B 2219/2642* (2013.01)

(58) Field of Classification Search
CPC ........ F24F 11/65; F24F 11/89; F24F 2140/00; F24F 2140/12; F24F 2140/50; F24F 2140/60; G05B 13/026; G05B 15/02; G06B 11/07; G06B 17/10
See application file for complete search history.

(56) References Cited

U.S. PATENT DOCUMENTS

| | | | |
|---|---|---|---|
| 10,175,681 B2 * | 1/2019 | Wenzel | ................. G06Q 10/04 |
| 2015/0316902 A1 | 11/2015 | Wenzel et al. | |
| 2018/0087790 A1 * | 3/2018 | Perez | ....................... F24F 11/56 |
| 2018/0373234 A1 * | 12/2018 | Khalate | ................... G06F 11/07 |
| 2019/0011145 A1 * | 1/2019 | Willmott | .................. F24F 11/63 |
| 2019/0032942 A1 * | 1/2019 | Willmott | .................. F24F 11/30 |

OTHER PUBLICATIONS

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609.05191, 2016, 44 pages.

Nevena et al. Data center cooling using model-predictive control, 10 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

* cited by examiner

CENTRAL PLANT CONTROL SYSTEM WITH LINEAR SOLVER FOR COMPUTATION REDUCTION

CROSS-REFERENCE TO RELATED PATENT APPLICATIONS

This application claims the benefit of and priority to U.S. Provisional Patent Application No. 62/537,793, filed Jul. 27, 2017, which is incorporated herein by reference in its entirety.

BACKGROUND

The present disclosure relates generally to the operation of a central plant for serving building thermal energy loads. The present disclosure relates more particularly to systems and methods for optimizing the operation of one or more subplants of a central plant.

A heating, ventilation and air conditioning (HVAC) system (also referred to as "a central plant" or "an energy plant" herein) may include various types of equipment configured to serve the thermal energy loads of a building or building campus. For example, a central plant may include HVAC devices such as heaters, chillers, heat recovery chillers, cooling towers, or other types of equipment configured to provide heating or cooling for the building. Some central plants include thermal energy storage configured to store the thermal energy produced by the central plant for later use.

A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling for the air. The working fluid then returns to the central plant to receive further heating or cooling and the cycle continues.

Controlling the central plant includes determining a set of operating parameters of the HVAC devices. In particular, some HVAC device operates according to a selected operating parameter from a range of operating parameters. Examples of the operating parameters include operating capacity (e.g., 50% capacity) of corresponding HVAC devices. Determining a set of operating parameters includes, for a candidate set of operating parameters, predicting thermodynamic states (e.g., pressure values, temperatures values, mass flow values, etc.) of different HVAC devices in operation together, and predicting power consumption of the central plant based on the predicted thermodynamic states. By comparing power consumptions of different candidate sets of operating parameters, a candidate set with the lowest power consumption may be determined as the set of operating parameters.

One conventional approach of predicting thermodynamic states of a central plant for a candidate set of operating parameters includes computing the full thermodynamic states by a non-linear solver. However, predicting thermodynamic states of the central plant in a complex arrangement by the non-linear solver is inefficient in terms of computational resources (e.g., processor usage and memory used). Furthermore, predicting thermodynamic states for multiple sets of operating parameters, and comparing power consumptions for multiple sets of operating parameters to determine a set of thermodynamic states rendering a lower power consumption through a conventional approach is inefficient and computationally exhaustive.

SUMMARY

One implementation of the present disclosure is a system to operate an energy plant. The system includes a processing circuit comprising a processor and a memory. The processing circuit is configured to obtain plant netlist data describing a plurality of heat, ventilation, and air conditioning (HVAC) devices of the energy plant and connections of the plurality of HVAC devices to corresponding nodes. Each HVAC device is configured to operate according to a corresponding operating parameter. The processing circuit is further configured to identify, from a plurality of thermodynamic states of the energy plant at a plurality of nodes, a first reduced subset of the plurality of thermodynamic states to be predicted based on the connections of the plurality of HVAC devices. The processing circuit is further configured to identify, from the first reduced subset, a second reduced subset of the plurality of thermodynamic states to be predicted by propagating a known value of the plurality of thermodynamic states using a linear solver. The processing circuit is further configured to predict the second reduced subset of the plurality of thermodynamic states using a non-linear solver. The processing circuit is further configured to determine the plurality of thermodynamic states of the energy plant at the plurality of nodes based on the predicted second reduced subset of the plurality of thermodynamic states. The processing circuit is further configured to determine a set of operating parameters of the plurality of HVAC devices based on the plurality of thermodynamic states of the energy plant at the plurality of nodes. The processing circuit is further configured to operate the plurality of HVAC devices according to the set of operating parameters.

In some embodiments, the processing circuit is configured to generate an incidence matrix indicating the connections of the plurality of HVAC devices, obtain an augmented matrix indicating linear relationships of the first reduced subset of the plurality of thermodynamic states, and obtain an occurrence matrix indicating non-linear relationships of the first reduced subset of the plurality of thermodynamic states.

In some embodiments, a row of the augmented matrix corresponds to a number of the linear relationships and a column of the augmented matrix corresponds to a corresponding unknown value of the first reduced subset of the plurality of thermodynamic states.

In some embodiments, the processing circuit is configured to perform a PLU factorization on the incidence matrix to obtain a permutation matrix of the incidence matrix. The permutation matrix may indicate rows in a sequential order to be solved by the linear solver. The processing circuit may be further configured to determine whether at least one of the first reduced subset of the plurality of thermodynamic states is predictable using the linear solver based on the augmented matrix.

In some embodiments, the processing circuit is configured to predict a predictable unknown value of the first reduced subset of the plurality of thermodynamic states using the linear solver, in response to determining that the at least one of the first reduced subset of the plurality of thermodynamic states is predictable based on the augmented matrix. The processing circuit may be further configured to determine whether an additional one of the first reduced subset of the plurality of thermodynamic states is predictable using the linear solver based on the augmented matrix.

In some embodiments, the processing circuit is configured to determine whether at least one of the first reduced subset of the plurality of thermodynamic states is predictable using the linear solver based on the occurrence matrix, in response to determining that no remaining unknown value of the first reduced subset of the plurality of thermodynamic states is predictable based on the augmented matrix.

In some embodiments, the processing circuit is configured to predict a predictable unknown value of the first reduced subset of the plurality of thermodynamic states using the linear solver, in response to determining that the at least one of the first reduced subset of the plurality of thermodynamic states is predictable based on the occurrence matrix. The processing circuit may be further configured to determine whether an additional one of the first reduced subset of the plurality of thermodynamic states is predictable using the linear solver based on the augmented matrix.

In some embodiments, the processing circuit is configured to predict an unknown value of the first reduced subset of the plurality of thermodynamic states based on system level relationships of the plurality of HVAC devices. The second reduced subset may include remaining unknown values of the first reduced subset of the plurality of thermodynamic states and may exclude predicted values of the first reduced subset.

In some embodiments, the second reduced subset of the plurality of thermodynamic states is iteratively predicted by propagating the known value of the plurality of thermodynamic states using the linear solver.

Another implementation of the present disclosure is a non-transitory computer readable medium storing instructions to predict a plurality of thermodynamic states of an energy plant. The instructions, when executed by the one or more processors, cause the one or more processors to obtain plant netlist data describing a plurality of heat, ventilation, and air conditioning (HVAC) devices of the energy plant and connections of the plurality of HVAC devices to corresponding nodes. Each HVAC device may be configured to operate according to a corresponding operating parameter. The instructions, when executed by the one or more processors, further cause the one or more processors to identify, from a plurality of thermodynamic states of the energy plant at a plurality of nodes, a first reduced subset of the plurality of thermodynamic states to be predicted based on the connections of the plurality of HVAC devices. The instructions, when executed by the one or more processors, further cause the one or more processors to identify, from the first reduced subset, a second reduced subset of the plurality of thermodynamic states to be predicted by propagating a known value of the plurality of thermodynamic states using a linear solver. The instructions, when executed by the one or more processors, further cause the one or more processors to predict the second reduced subset of the plurality of thermodynamic states using a non-linear solver. The instructions, when executed by the one or more processors, further cause the one or more processors to determine the plurality of thermodynamic states of the energy plant at the plurality of nodes based on the predicted second reduced subset of the plurality of thermodynamic states. The instructions, when executed by the one or more processors, further cause the one or more processors to determine a set of operating parameters of the plurality of HVAC devices based on the plurality of thermodynamic states of the energy plant at the plurality of nodes. The instructions, when executed by the one or more processors, further cause the one or more processors to operate the plurality of HVAC devices according to the set of operating parameters.

In some embodiments, the non-transitory computer readable medium stores instructions, when executed by the one or more processors, cause the one or more processors to generate an incidence matrix indicating the connections of the plurality of HVAC devices, obtain an augmented matrix indicating linear relationships of the first reduced subset of the plurality of thermodynamic states, and obtain an occurrence matrix indicating non-linear relationships of the first reduced subset of the plurality of thermodynamic states.

In some embodiments, a row of the augmented matrix corresponds to a number of the linear relationships and a column of the augmented matrix corresponds to a corresponding unknown value of the first reduced subset of the plurality of thermodynamic states.

In some embodiments, the non-transitory computer readable medium stores instructions, when executed by the one or more processors, cause the one or more processors to perform a PLU factorization on the incidence matrix to obtain a permutation matrix of the incidence matrix, the permutation matrix indicating rows in a sequential order to be solved by the linear solver, and determine whether at least one of the first reduced subset of the plurality of thermodynamic states is predictable using the linear solver based on the augmented matrix.

In some embodiments, the non-transitory computer readable medium stores instructions, when executed by the one or more processors, cause the one or more processors to predict a predictable unknown value of the first reduced subset of the plurality of thermodynamic states using the linear solver, in response to determining that the at least one of the first reduced subset of the plurality of thermodynamic states is predictable based on the augmented matrix, and determine whether an additional one of the first reduced subset of the plurality of thermodynamic states is predictable using the linear solver based on the augmented matrix.

In some embodiments, the non-transitory computer readable medium stores instructions, when executed by the one or more processors, cause the one or more processors to determine whether at least one of the first reduced subset of the plurality of thermodynamic states is predictable using the linear solver based on the occurrence matrix, in response to determining that no remaining one of the first reduced subset of the plurality of thermodynamic states is predictable based on the augmented matrix.

In some embodiments, the non-transitory computer readable medium stores instructions, when executed by the one or more processors, cause the one or more processors to predict a predictable unknown value of the first reduced subset of the plurality of thermodynamic states using the linear solver, in response to determining that the at least one of the first reduced subset of the plurality of thermodynamic states is predictable based on the occurrence matrix, and determine whether an additional one of the first reduced subset of the plurality of thermodynamic states is predictable using the linear solver based on the augmented matrix.

In some embodiments, the non-transitory computer readable medium stores instructions, when executed by the one or more processors, cause the one or more processors to predict an unknown value of the first reduced subset of the plurality of thermodynamic states based on system level relationships of the plurality of HVAC devices, the second reduced subset comprising remaining unknown values of the first reduced subset of the plurality of thermodynamic states and excluding predicted values of the first reduced subset.

In some embodiments, the second reduced subset of the plurality of thermodynamic states is iteratively predicted by propagating the known value of the plurality of thermodynamic states using the linear solver.

Another implementation of the present disclosure is a non-transitory computer readable medium storing instructions to predict a plurality of thermodynamic states of an energy plant at a plurality of nodes. The instructions, when executed by the one or more processors, cause the one or more processors to obtain plant netlist data describing a plurality of heat, ventilation, and air conditioning (HVAC) devices of the energy plant and connections of the plurality of HVAC devices to corresponding nodes. Each HVAC device may be configured to operate according to a corresponding operating parameter. The instructions, when executed by the one or more processors, further cause the one or more processors to identify, from the plurality of thermodynamic states of the energy plant at the plurality of nodes, a first reduced subset of the plurality of thermodynamic states to be predicted based on the connections of the plurality of HVAC devices. The instructions, when executed by the one or more processors, further cause the one or more processors to identify, from the first reduced subset, a second reduced subset of the plurality of thermodynamic states to be predicted by propagating a known value of the plurality of thermodynamic states using a linear solver. The instructions, when executed by the one or more processors, further cause the one or more processors to predict the second reduced subset of the plurality of thermodynamic states using a non-linear solver. The instructions, when executed by the one or more processors, further cause the one or more processors determine the plurality of thermodynamic states of the energy plant at the plurality of nodes based on the predicted second reduced subset of the plurality of thermodynamic states.

In some embodiments, the non-transitory computer readable medium stores instructions, when executed by the one or more processors, cause the one or more processors to generate an incidence matrix indicating the connections of the plurality of HVAC devices, obtain an augmented matrix indicating linear relationships of the first reduced subset of the plurality of thermodynamic states; and obtain an occurrence matrix indicating non-linear relationships of the first reduced subset of the plurality of thermodynamic states.

DETAILED DESCRIPTION

Overview

Referring generally to the FIGURES, disclosed herein are systems and methods for predicting thermodynamic states (e.g., pressure, temperature, enthalpy, etc.) at various locations within an HVAC system through disclosed computation reduction based on a linear solver, and determining a set of operating parameters for operating the HVAC system according to the predicted thermodynamic states.

In some embodiments, a central plant controller disclosed herein obtains plant netlist data, and reduces a number of computations to be performed by a non-linear solver based on the plant netlist data. The plant netlist data describe a plurality of HVAC devices (e.g., chillers, boilers, pumps, fans, valves, etc.) of the HVAC system and schematic connections thereof. In one approach, the central plant controller identifies, from a set of thermodynamic states at various locations within the HVAC system, a first reduced subset of the thermodynamic states to be predicted based at least part on schematic connections of the plurality of HVAC devices. Moreover, the central plant identifies, from the first reduced subset, a second reduced subset of the plurality of thermodynamic states to be predicted by propagating a known value of the plurality of thermodynamic states using a linear solver. The central plant controller may predict a reduced subset of the thermodynamic states by applying a set of operating parameters (e.g., capabilities, load capacities, etc.) to the non-linear solver.

Beneficially, the central plant controller improves an operation efficiency of the HVAC system. In one aspect, the central plant controller can predict a reduced number of thermodynamic states by a non-linear solver based on schematic connections of the plurality of HVAC devices and linear propagation of known values, rather than predicting the full set of thermodynamic states by the non-linear solver. Accordingly, the central plant controller can predict thermodynamic states for different sets of operating parameters in a computationally efficient manner. Moreover, the central plant controller can determine a set of operating parameters rendering reduced power consumption of the HVAC system with improved efficiency, and operate the HVAC system accordingly.

Building and HVAC System

Figure 1:
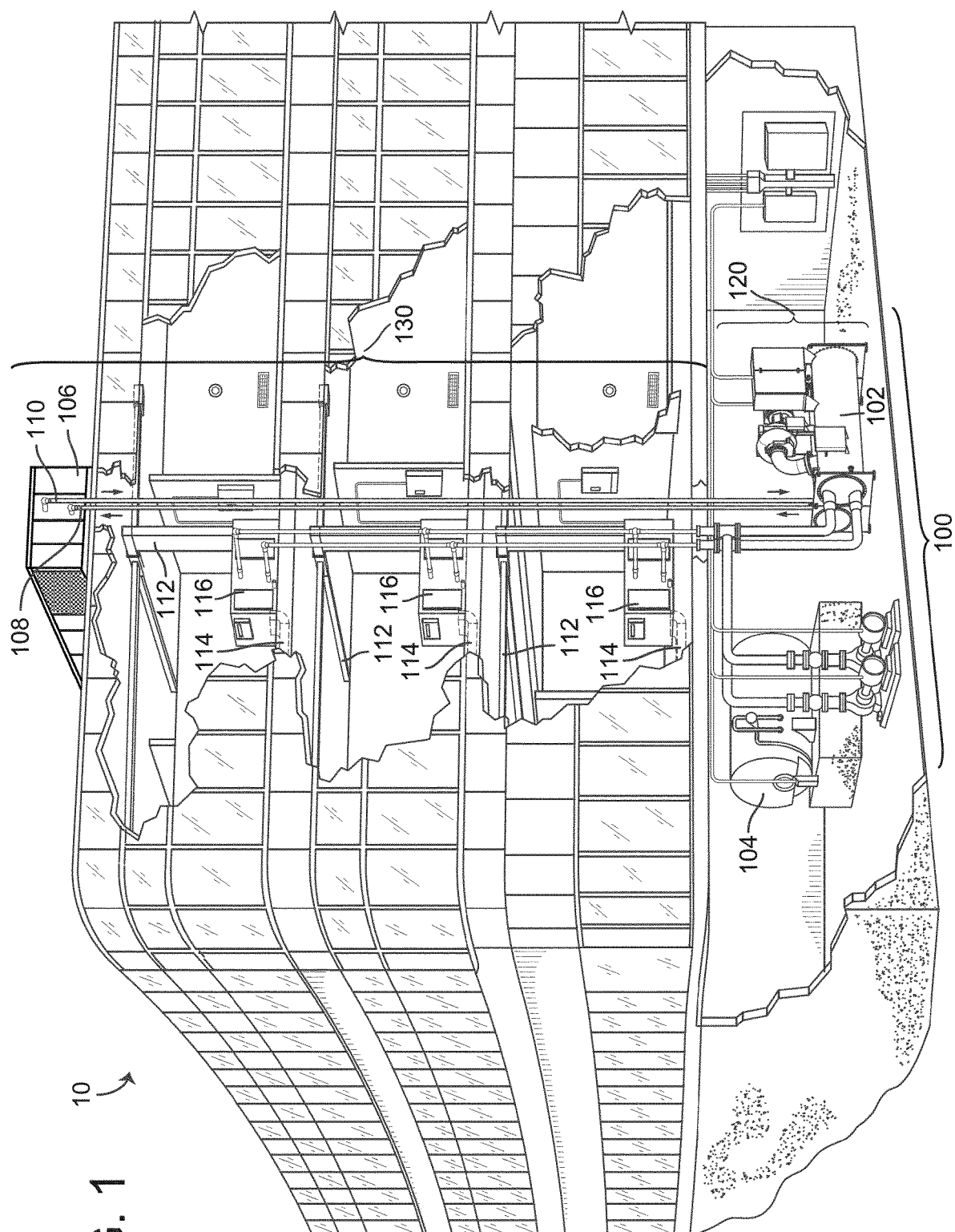
FIG. 1 is a drawing of a building equipped with an HVAC system, according to some embodiments.
Figure 2:
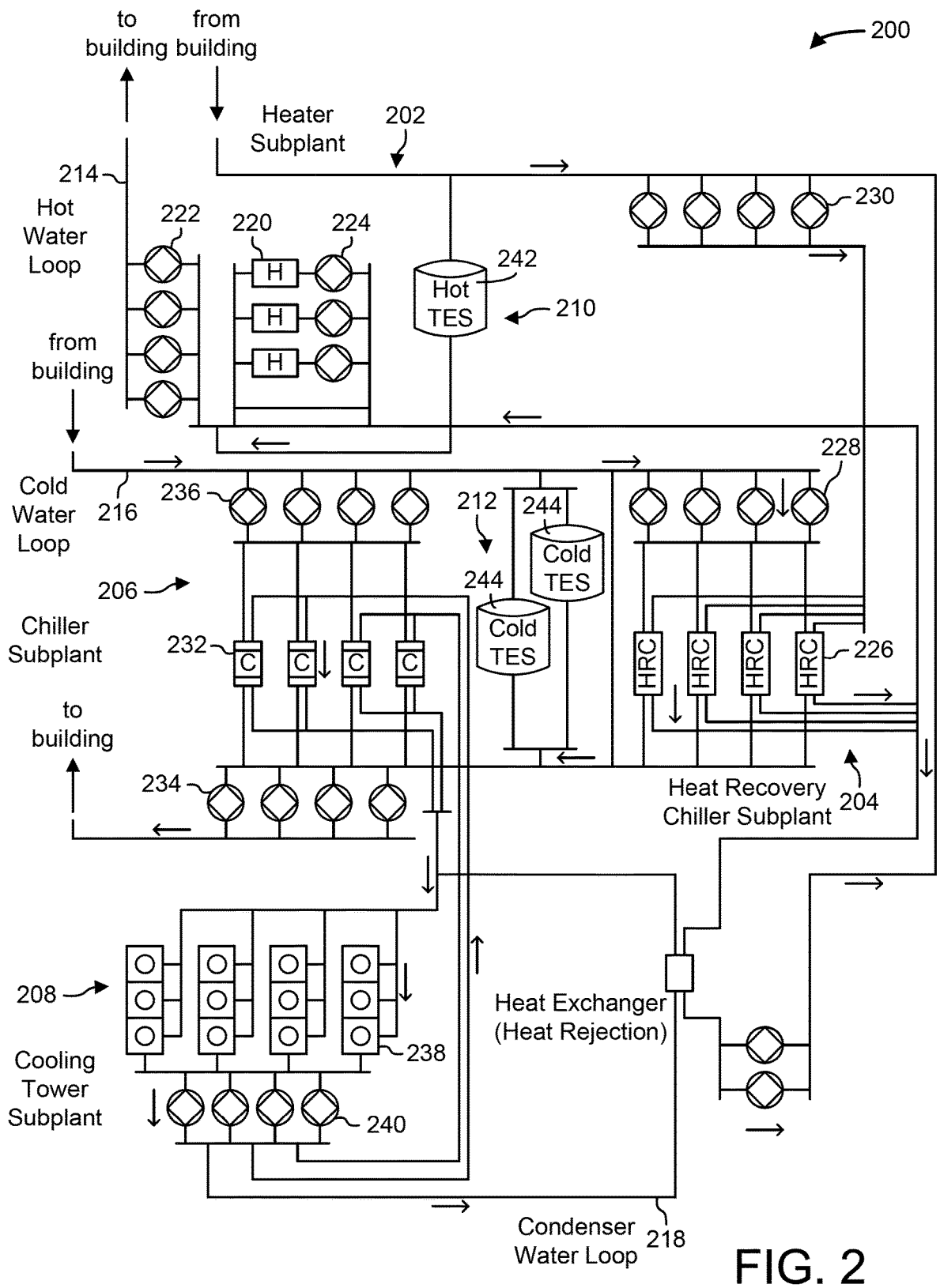
FIG. 2 is a schematic of a waterside system, which can be used as part of the HVAC system of FIG. 1, according to some embodiments.
Figure 3:
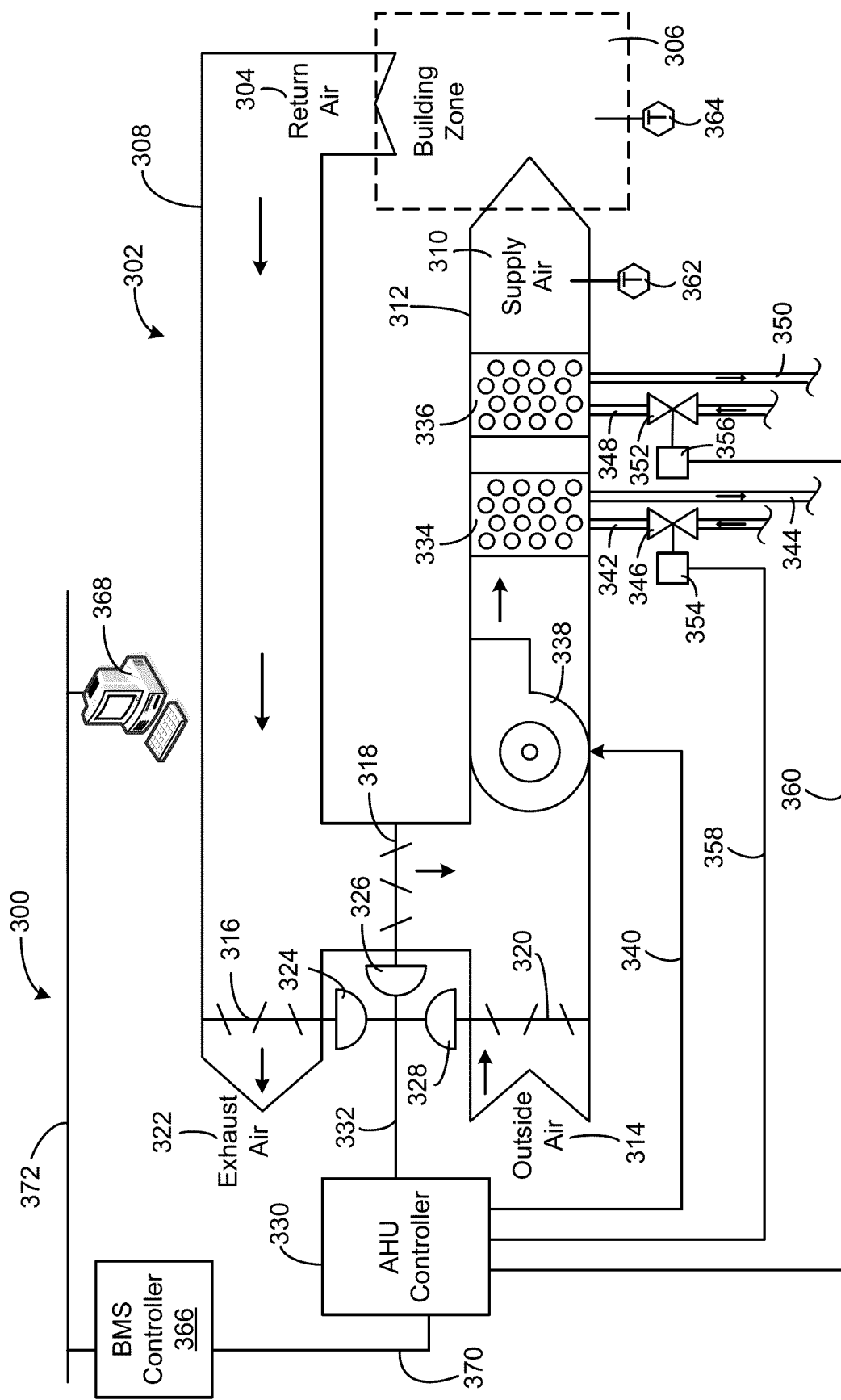
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4:
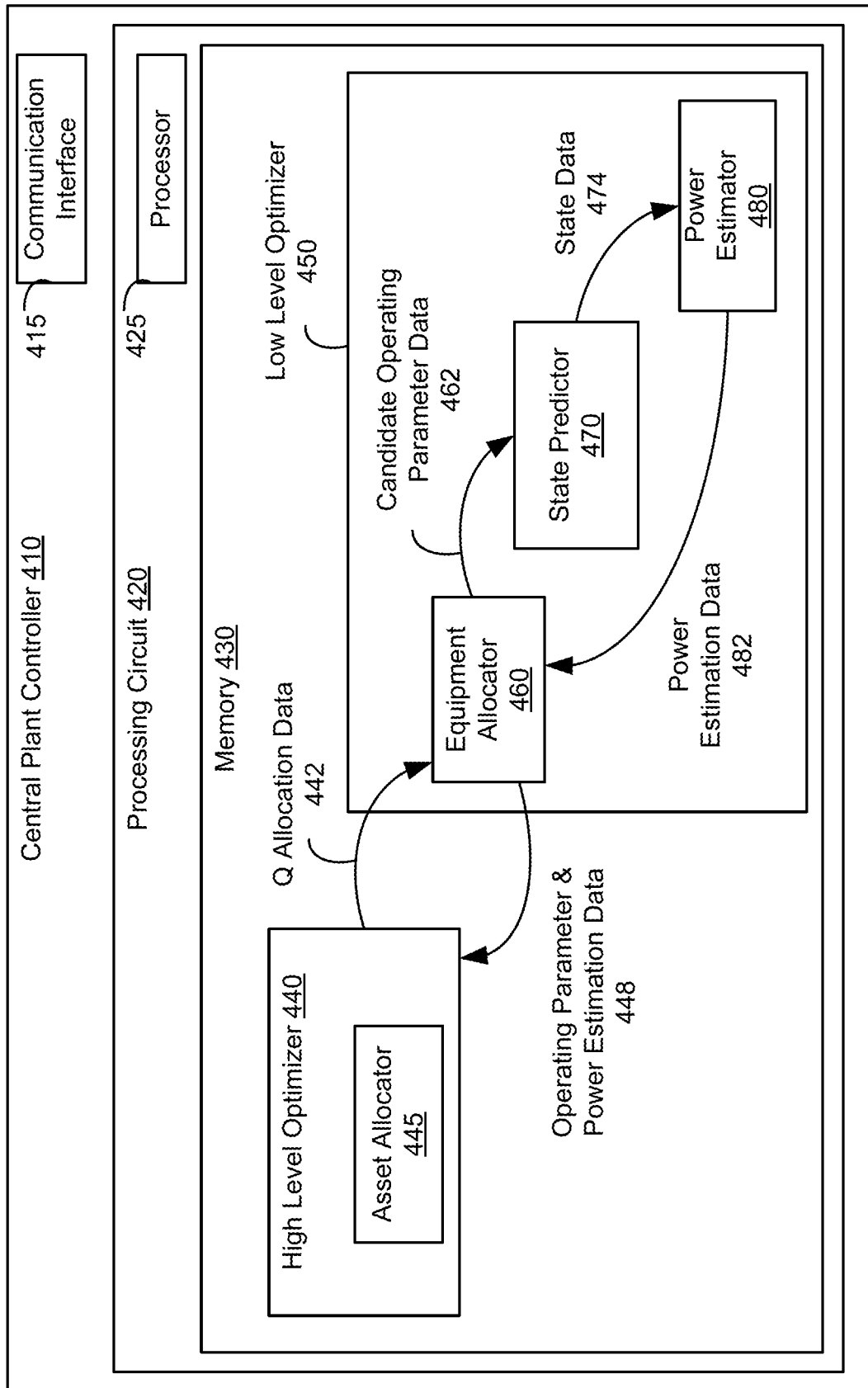
FIG. 4 is a block diagram of a central plant controller, according to some embodiments.

Referring to FIG. 4, illustrated is a block diagram of a central plant controller 410, according to some embodiments. In some embodiments, the central plant controller 410 is part of the HVAC system 100 of FIG. 1. Alternatively, the central plant controller 410 is coupled to the HVAC system 100 through a communication link. The central plant controller 410 may be the AHU controller 330 of FIG. 3, or a combination of the BMS controller 366 and the AHU controller 330 of FIG. 3. In one configuration, the central plant controller 410 includes a communication interface 415, and a processing circuit 420. These components operate together to determine a set of operating parameters for operating various HVAC devices of the HVAC system 100. In some embodiments, the central plant controller 410 includes additional, fewer, or different components than shown in FIG. 4.

The communication interface 415 facilitates communication of the central plant controller 410 with other HVAC devices (e.g., heaters, chillers, air handling units, pumps, fans, thermal energy storage, etc.). The communication interface 415 can be or include wired or wireless communications interfaces (e.g., jacks, antennas, transmitters, receivers, transceivers, wire terminals, etc.). In various embodiments, communications via the communication interface 415 can be direct (e.g., local wired or wireless communications) or via a communications network (e.g., a WAN, the Internet, a cellular network, etc.). For example, the communication interface 415 can include an Ethernet/USB/RS232/RS485 card and port for sending and receiving data through a network. In another example, the communication interface 415 can include a Wi-Fi transceiver for communicating via a wireless communications network. In another example, the communication interface 415 can include cellular or mobile phone communication transceivers.

The processing circuit 420 is a hardware circuit executing instructions to determine a set of parameters for operating HVAC devices of the HVAC system 100. In one embodiment, the processing circuit 420 includes a processor 425, and memory 430 storing instructions (or program code) executable by the processor 425. The memory 430 may be any non-transitory computer readable medium. In one embodiment, the instructions executed by the processor 425 cause the processor 425 to form software modules including a high level optimizer 440, and a low level optimizer 450. The high level optimizer 440 may determine how to distribute thermal energy loads across HVAC devices (e.g., subplants, chillers, heaters, valves, etc.) for each time step in the prediction window, for example, to minimize the cost of energy consumed by the HVAC devices. The low level optimizer 450 may determine how to operate each subplant according to the thermal energy loads determined by the high level optimizer 440. In other embodiments, the processor 425 and the memory 430 may be omitted, and the high level optimizer 440 and the low level optimizer 450 may be implemented as hardware modules by a reconfigurable circuit (e.g., field programmable gate array (FPGA)), an application specific integrated circuit (ASIC), or any circuitries, or a combination of software modules and hardware modules.

In one implementation, the high level optimizer 440 determines thermal energy loads of HVAC devices of the HVAC system 100, and generates Q allocation data 442 indicating the determined thermal energy loads. The high level optimizer 440 may provide the Q allocation data 442 to the low level optimizer 450. In return, the high level optimizer 440 may receive, from the low level optimizer 450, operating parameter and power estimation data 448 indicating a set of operating parameters to operate HVAC devices of the HVAC system 100, predicted power consumptions when operating the HVAC system 100 according to the set of operating parameters, or both. Based on the operating parameter and power estimation data 448, the high level optimizer 440 can operate the HVAC system 100 accordingly or generate different Q allocation data 442 for further optimization. The high level optimizer 440 and the low level optimizer 450 may operate together online in real time, or offline at different times.

In one or more embodiments, the high level optimizer 440 includes an asset allocator 445 that determines a distribution of thermal energy loads of the HVAC devices of the HVAC system 100 based on a predicted thermal energy load of the HVAC system 100. In some embodiments, the asset allocator 445 determines the optimal load distribution by minimizing the total operating cost of HVAC system 100 over the prediction time window. In one aspect, given a predicted thermal energy load $\hat{l}_k$ and utility rate information received through a user input or automatically determined by a scheduler (not shown), the asset allocator 445 may determine a distribution of the predicted thermal energy load $\hat{l}_k$ across subplants to minimize the cost. The asset allocator 445 generates the Q allocation data 442 indicating the predicted loads $\hat{l}_k$ of different HVAC devices of the HVAC system 100 and provides the Q allocation data 442 to the low level optimizer 450.

In some embodiments, distributing thermal energy load includes causing TES subplants to store thermal energy during a first time step for use during a later time step. Thermal energy storage may advantageously allow thermal energy to be produced and stored during a first time period when energy prices are relatively low and subsequently retrieved and used during a second time period when energy prices are relatively high. The high level optimization may be different from the low level optimization in that the high level optimization has a longer time constant due to the thermal energy storage provided by TES subplants. The high level optimization may be described by the following equation:

$$\theta^*_{HL} = \arg\min_{\theta_{HL}} J_{HL}(\theta_{HL}) \qquad \text{Eq. (1)}$$

where $O^*_{HL}$ contains the optimal high level decisions (e.g., the optimal load $\dot{Q}$ for each of subplants) for the entire prediction period and $J_{HL}$ is the high level cost function.

To find the optimal high level decisions $O^*_{HL}$, the asset allocator 445 may minimize the high level cost function $J_{HL}$. The high level cost function $J_{HL}$ may be the sum of the economic costs of each utility consumed by each of subplants for the duration of the prediction time period. For example, the high level cost function $J_{HL}$ may be described using the following equation:

$$J_{HL}(\theta_{HL}) = \sum_{k=1}^{n_h} \sum_{i=1}^{n_s} [\sum_{j=1}^{n_u} t_s \cdot c_{jk} u_{jik}(\theta_{HL})] \qquad \text{Eq. (2)}$$

where $n_h$ is the number of time steps k in the prediction time period, $n_s$ is the number of subplants, $t_s$ is the duration of a time step, $c_{jk}$ is the economic cost of utility j at a time step k of the prediction period, and $u_{jik}$ is the rate of use of utility j by subplant i at time step k. In some embodiments, the cost function $J_{HL}$ includes an additional demand charge term such as:

$$w_d c_{demand} \max_{n_{jik}}(u_{elec}(\theta_{HL}), u_{max,ele}) \qquad \text{Eq. (3)}$$

where $w_d$ is a weighting term, $c_{demand}$ is the demand cost, and the max( ) term selects the peak electricity use during the applicable demand charge period.

In some embodiments, the high level optimization performed by the high level optimizer 440 is the same or similar to the high level optimization process described in U.S. patent application Ser. No. 14/634,609 filed Feb. 27, 2015 and titled "High Level Central Plant Optimization," which is incorporated by reference herein.

The low level optimizer 450 receives the Q allocation data 442 from the high level optimizer 440, and determines operating parameters (e.g., capacities) of the HVAC devices of the HVAC system 100. In one or more embodiments, the low level optimizer 450 includes an equipment allocator 460, a state predictor 470, and a power estimator 480. Together, these components operate to determine a set of operating parameters, for example, rendering reduced power consumption of the HVAC system 100 for a given set of thermal energy loads indicated by the Q allocation data 442, and generate operating parameter data indicating the determined set of operating parameters. Particularly, the low level optimizer 450 determines the set of operating parameters based on schematic representations of HVAC devices of the HVAC system 100. In some embodiments, the low level optimizer 450 includes different, more, or fewer components, or includes components in different arrangements than shown in FIG. 4.

In one configuration, the equipment allocator 460 receives the Q allocation data 442 from the high level optimizer 440, and generates candidate operating parameter data 462 indicating a set of candidate operating parameters of HVAC devices of the HVAC system 100. The state predictor 470 receives the candidate operating parameter data 462 and predicts thermodynamic states of the HVAC system 100 at various locations for the set of candidate operating parameters. The state predictor 470 generates state data 474 indicating the predicted thermodynamic states, and provides the state data 474 to the power estimator 480. The power estimator 480 predicts, based on the state data 474, total power consumed by the HVAC system 100 operating according to the set of candidate operating parameters, and generates the power estimation data 482 indicating the predicted power consumption. The equipment allocator 460 may repeat the process with different sets of candidate operating parameters to obtain predicted power consumptions of the HVAC system 100 operating according to different sets of candidate operating parameters, and select a set of operating parameters rendering a lower power consumption. The equipment allocator 460 may generate the operating parameter and power estimation data 448 indicating (i) the selected set of operating parameters and (ii) predicted power consumption of the power plant when operating according to the selected set of operating parameters, and provide the operating parameter and power estimation data 448 to the high level optimizer 440.

The equipment allocator 460 is a component that interfaces with the high level optimizer 440. In one aspect, the equipment allocator 460 receives the Q allocation data, and determines a candidate set of operating parameters of HVAC devices of the HVAC system 100. For example, the equipment allocator 460 determines that a first chiller is assigned to operate with a first range of thermal energy load and a second chiller is assigned to operate with a second range of thermal energy load based on the Q allocation data. In this example, the equipment allocator 460 may determine that operating parameters (e.g., between 30% to 50% capacity) of the first chiller can achieve the first range of thermal energy load and operating parameters (e.g., between 60~65% capacity) of the second chiller can achieve the second range of thermal energy load. From different combinations of operating parameters of the first chiller and the second chiller, the equipment allocator 460 selects a candidate set of operating parameters (e.g., 45% capacity of the first chiller and 60% capacity of the second chiller). Additionally, the equipment allocator 460 generates the candidate operating parameter data 462 indicating the selected candidate set of operating parameters, and provides the candidate operating parameter data 462 to the state predictor 470.

The state predictor 470 predicts an operating condition of the HVAC system 100 based on a set of operating parameters of the HVAC system 100 as indicated by the candidate operating parameter data 462. The operating condition of the HVAC system 100 includes thermodynamic states at various locations of the HVAC system 100. Examples of thermodynamic states include input pressure value, output pressure value, input mass flow value, output mass flow value, input enthalpy value, output enthalpy value, etc. In one approach, predicting thermodynamic states of the HVAC system 100 includes applying the set of operating parameters to a linear solver and a non-linear solver. Generally, the non-linear solver consumes a large amount of resources (e.g., processor threads and storage capacity) to obtain a solution. In one or more embodiments, the state predictor 470 reduces a number of unknown thermodynamic states to be predicted based on schematic arrangements of HVAC devices of the HVAC system 100, and may further reduce the number of unknown thermodynamic states to be predicted by propagating known thermodynamic states based on the operating parameters using the linear solver, as described in detail below with respect to FIGS. 5 through 13. Advantageously, a fewer number of unknown thermodynamic states can be determined by the non-linear solver, thereby improving efficiency of predicting the thermodynamic states for the set of operating parameters. The state predictor 470 generates state data 474 indicating the predicted thermodynamic states for the candidate set of operating parameters, and provides the state data 474 to the power estimator 480.

The power estimator 480 predicts power consumed by the HVAC system 100 based on the state data 474. In one approach, the power estimator 480 determines, for each HVAC device, a predicted power consumption based on thermodynamic states (e.g., pressure values, mass flow values, enthalpy values, etc.) and an operating parameter (e.g., capacity) of the HVAC device. In addition, the power estimator 480 may add power consumptions of the HVAC devices of the HVAC system 100 to obtain a total power consumption of the HVAC system 100. The power estimator 480 generates the power estimation data 482 indicating the total power consumption of the HVAC system 100, power consumption of each HVAC device, or any combination of them, and provides the power estimation data 482 to the equipment allocator 460.

In some embodiments, the equipment allocator 460 compares predicted power consumptions of the HVAC system 100 for multiple sets of operating parameters, and selects a set of operating parameters for operating the HVAC system 100. In one approach, the equipment allocator 460 selects, from the multiple sets of operating parameters, the set of operating parameters rendering the lowest power consumption. Hence, the HVAC system 100 operating based on the set of operating parameters determined by the equipment allocator 460 benefits from reduced power consumption. The equipment allocator 460 may generate the operating parameter and power estimation data 448 indicating the set of operating parameters to operate HVAC devices of the HVAC system 100, predicted power consumptions when operating the HVAC system 100 according to the set of operating parameters, or any combination of them, and provide the operating parameter and power estimation data 448 to the high level optimizer 440.

Figure 5:
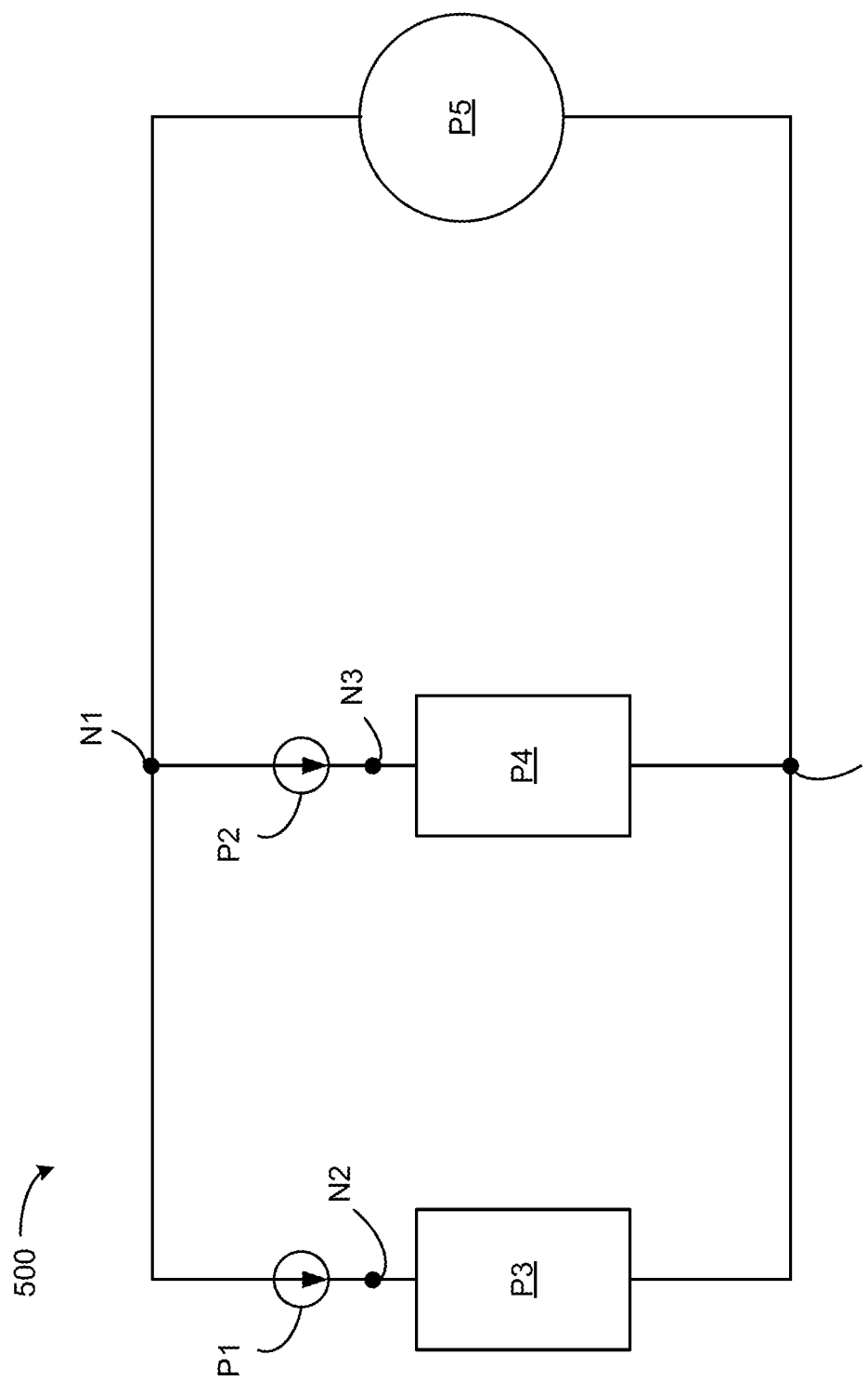
FIG. 5 is a schematic representation of an HVAC system, according to some embodiments.

Referring to FIG. 5, illustrated is an example schematic representation 500 of an HVAC system, according to some embodiments. In the example shown in FIG. 5, the example schematic representation 500 includes water pumps P1, P2, chillers P3, P4, and cold load P5. In this example, the water pump P1 is coupled between nodes N1, N2; the water pump P2 is coupled between nodes N1, N3; the chiller P3 is coupled between nodes N2, N4; the chiller P4 is coupled between nodes N3, N4; and the cold load P5 is coupled between nodes N1, N4. In one aspect, the schematic arrangement of HVAC devices of the HVAC system is analogous to a schematic arrangement of electronic circuits. Hence, the schematic arrangement of the HVAC devices of the HVAC system can be represented by plant netlist data as shown below.

Example Plant Netlist

LC ColdLoad N4 N1 CHW
CHWP PCHWP1 N1 N2 CHW
CHWP PCHWP2 N1 N3 CHW
CHLR Chiller1 N2 N4 CHW
CHLR Chiller2 N3 N4 CHW Schematically representing arrangements of the HVAC devices of the HVAC system enables the state predictor 470 to reduce a number of unknown thermodynamic states determined by a non-linear solver. In some embodiments, the state predictor 470 reduces a number of unknown thermodynamic states to be predicted by a non-linear solver based on energy, mass, and momentum balances through object oriented programming. For example, all pressures into and out of the node N1 should be equal, hence one or more unknown input/output pressure values of different HVAC devices may be assigned to a common handle object based on this aspect to merge repetitive unknown pressure values. For mass flow values, if a node is connected to only two HVAC devices, an unknown input mass flow value of a HVAC device may be assigned to a common handle object with an unknown output mass flow value of another HVAC device sharing the same node to merge repetitive unknown mass flow values. A number of unknown enthalpy values may be reduced in a similar manner. Hence, the state predictor 470 reduces a number of unknown thermodynamic states to be predicted by the non-linear solver based on schematic connections of the HVAC system. The state predictor 470 may further reduce a number of unknown thermodynamic states to be predicted by propagating known thermodynamic states (e.g., predetermined thermodynamic states or values derived based on the set of operating parameters) based on the linear solver. Example processes of reducing a number of unknown thermodynamic states and predicting thermodynamic states are further provided below with respect to FIGS. 6 through 13.

Figure 6:
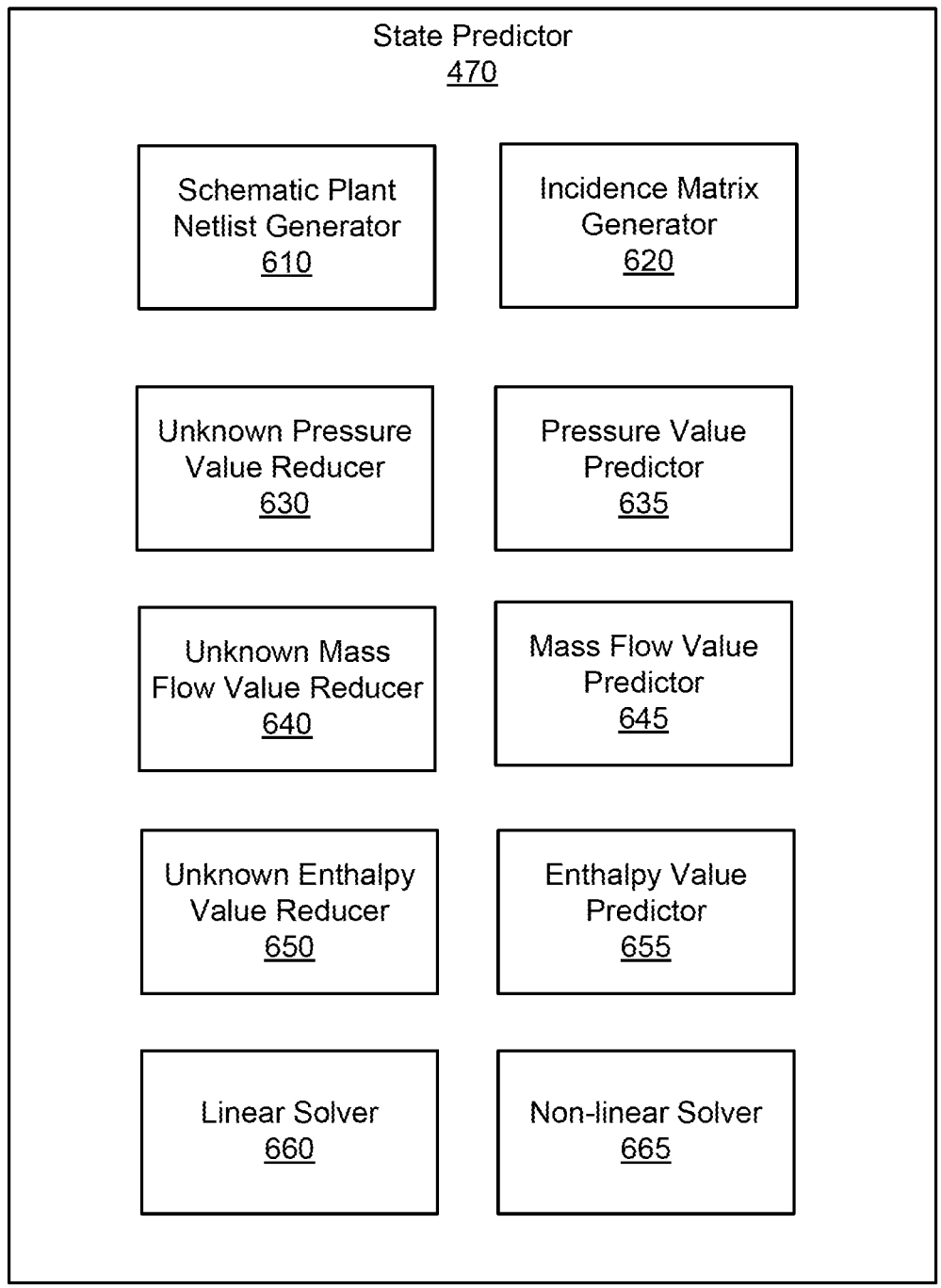
FIG. 6 is a block diagram of a state predictor of FIG. 4, according to some embodiments.

Referring to FIG. 6, illustrated is a block diagram of the state predictor 470 of FIG. 4, according to some embodiments. In some embodiments, the state predictor 470 includes a schematic plant netlist generator 610, an incidence matrix generator 620, an unknown pressure value reducer 630, a pressure value predictor 635, an unknown mass flow value reducer 640, a mass flow value predictor 645, an unknown enthalpy value reducer 650, an enthalpy value predictor 655, a linear solver 660, and a non-linear solver 665. These components operate together to predict thermodynamic states of the HVAC system at a plurality of nodes by reducing a number of computations performed by the non-linear solver 665 based at least part on schematic connections of the HVAC devices and linear propagation of known values as disclosed herein. In some embodiments, the state predictor 470 includes different, fewer, or additional components than shown in FIG. 6.

The linear solver 660 is a software module capable of computing linear problems, and the non-linear solver 665 is a software module capable of computing non-linear problems. An example of the non-linear solver 665 includes an lsqnonlin solver. The entire thermodynamic states of the HVAC system at a plurality of nodes may be computed by the non-linear solver 665. However, the non-linear solver 665 is less efficient in terms of computational resources consumed than the linear solver 660. Other components of the state predictor 470 may operate together to reduce a number of unknown thermodynamic states to be predicted by the non-linear solver 665 based on schematic connections of the plurality of HVAC devices and linear propagation of known values.

The schematic plant netlist generator 610 is a component that generates plant netlist data describing schematic connections of the HVAC devices of the HVAC system. The schematic plant netlist generator 610 may generate a graphical user interface allowing a user to schematically define connections of the plurality of HVAC devices, and automatically generate plant netlist data accordingly. In some embodiments, the schematic plant netlist generator 610 may be separate from the state predictor 470. In some embodiments, the schematic plant netlist generator 610 may be omitted, and the plant netlist data may be manually entered by a user.

The incidence matrix generator 620 obtains the plant netlist data, and generates matrices based on schematic connections of HVAC devices of the HVAC system indicated by the plant netlist data according to graph theory. In one approach, the incidence matrix generator 620 generates an incidence matrix A representing schematic connections of HVAC devices of the HVAC system in a matrix format. The incidence matrix generator 620 may detect HVAC devices of the HVAC system and nodes based on the plant netlist data according to graph theory. A node represents, for example, a mixing point in two or more pipes. The incidence matrix A may be an n by m matrix, with n representing the number of HVAC devices, and m representing the number of nodes. A HVAC device coupled to a node through an input of the HVAC device may have a value of −1, and a HVAC device coupled to the node through an output of the HVAC device may have a value of 1. For example, the incidence matrix generator 620 obtains the following incidence matrix A for the example schematic representation 500 shown in FIG. 5.

$$A = \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix} \quad \text{Eq. (4)}$$

The incidence matrix generator 620 may further generate additional matrices from the incidence matrix A. For example, the incidence matrix A can be decomposed into two matrices, as shown below:

$$A = A_{Out} - A_{In} \quad \text{Eq. (5)}$$

where matrix $A_{Out}$ may have a value of 1 when the incidence matrix A has a value of 1, and matrix $A_{In}$ may have a value of 1 when the incidence matrix A has a value of −1. In one aspect, the incidence matrix A represents schematic connections of HVAC system into a linear framework. Based on the incidence matrix, additional matrices may be generated to reduce a number of unknown thermodynamic states to be predicted.

The unknown pressure value reducer 630 reduces a number of unknown pressure values to be predicted by the non-linear solver 665 based on the incidence matrix A, and generates a list indicating unknown pressure values to be predicted by the non-linear solver 665. In one approach, the unknown pressure value reducer 630 exploits a property that all pressures into and out of a node are identical. For example, for a node having three branches, pressure values of three branches can be represented as the following equations:

$$P_1 = P_2, P_2 = P_3, P_3 = P_1 \quad \text{Eq. (6)}$$

where $P_1$ is a pressure value of a first branch; $P_2$ is a pressure value of a second branch; and $P_3$ is a pressure value of a third branch.

The unknown pressure value reducer 630 then generates a weighted Laplacian matrix $L_1$ according to the following equation:

$$|A^T| * C * A = L_1 \quad \text{Eq. (7)}$$

where $A^T$ is a transpose matrix of the incidence matrix A, C=diag(1:n) and n is the number of devices in the HVAC system. The absolute value of the transpose matrix $|A^T|$ provides a directional adjacency matrix. The unknown pressure value reducer 630 can obtain weighted diagonal adjacency matrix $W_{Directional,Weighted}$ by subtracting the weighted Laplacian matrix $L_1$ from a degrees matrix $D_1$ including diagonal components of the weighted Laplacian matrix $L_1$. The weighted diagonal adjacency matrix $W_{Directional,Weighted}$ indicates a directional property of unknown thermodynamic states. The values of weighted diagonal adjacency matrix $W_{Directional,Weighted}$ directly correlate to unique device indices on each node. In one approach, a negative value indicates that an unknown thermodynamic state is an output value (e.g., $P_{Out}$) of a device coupled to a node, and a positive index indicates that the unknown thermodynamic state is an input value (e.g., $P_{In}$) of a device coupled to the node. For example, the unknown pressure value reducer 630 obtains the following weighted diagonal adjacency matrix $W_{Directional,Weighted}$ for the example schematic representation 500 shown in FIG. 5.

$$W_{Directional, Weighted} = \begin{bmatrix} 0 & 1 & 2 & -5 \\ -1 & 0 & 0 & 3 \\ -2 & 0 & 0 & 4 \\ 5 & -3 & -4 & 0 \end{bmatrix} \quad \text{Eq. (8)}$$

where the first row associated with the first node N1 has values '0, 1, 2, −5' indicating that the first node N1 is coupled to an input of the first water pump P1, an input of the second water pump P2, and an output of the cold load P5. Based on the weighted diagonal adjacency matrix $W_{Directional,Weighted}$, a number of unknown pressure values to be identified may be reduced.

Once the weighted diagonal adjacency matrix $W_{Directional,Weighted}$ is generated, the unknown pressure value reducer 630 creates handle objects, for example, through object oriented programming for unknown pressure values. Each row of this matrix can be parsed according to the following example.

Algorithm 1. Example pseudocode for parsing adjacency matrix

```
for i = 1:size(W,1)
    Devices = W(i,:);
    Devices(Devices==0) = [ ];
    for j = 2:numel(Devices)
        if Devices(j−1) < 0
            Var1 = DeviceArray(Devices(j−1).Out);
        else
            Var1 = DeviceArray(Devices(j−1).In);
        end
        if Devices(j) < 0
            Var2 = DeviceArray(Devices(j).Out);
        else
            Var2 = DeviceArray(Devices(j).In);
        end
        Var1 = Var2;
    end
end
```

In this example, DeviceArray is a function to obtain a vector of unknown devices in a row of the weighted diagonal adjacency matrix $W_{Directional,Weighted}$. Var1 and Var2 are handle objects assigned to input pressure values or output pressure values of devices. Hence, for each row of the weighted diagonal adjacency matrix $W_{Directional,Weighted}$ (i.e., for each node), unknown input pressure values and output pressure values of different devices sharing a common node can be assigned to a common handle object. Referring to the example schematic representation 500 shown in FIG. 5, ten total input and output unknown pressure values of five different devices (e.g., water pumps P1, P2, chillers P3, P4, and cold load P5) can be reduced to four unknown pressure values of four nodes N1, N2, N3, N4, based on the schematic arrangement indicated by the weighted diagonal adjacency matrix $W_{Directional,Weighted}$ and irrespective of the set of operating parameters of the devices.

The unknown pressure value reducer 630 may further reduce a number of unknown pressure values by applying known values (e.g., predetermined pressure values or values derived based on a set of operating parameters) and propagating known values (i.e., obtaining additional known values) using the linear solver 660. The unknown pressure value reducer 630 may generate a list of unknown pressure values remaining to be predicted by the non-linear solver 665.

The pressure value predictor 635 receives the list of unknown pressure values to be predicted, and obtains predicted pressure values in the received list by the non-linear solver 665.

The unknown mass flow value reducer 640 reduces a number of unknown mass flow values to be predicted by the non-linear solver 665 based on the incidence matrix A, and generates a list of unknown mass flow values to be predicted by the non-linear solver 665. In one approach, the unknown mass flow value reducer 640 exploits a property that if a node is connected to a single input and a single output, an input mass flow and an output mass flow are identical as shown below:

$$m_{in} = m_{out} \quad \text{Eq. (9)}$$

where $m_{in}$ is an input mass flow value and $m_{out}$ is an output mass flow value. The unknown mass flow value reducer 640 may obtain the weighted diagonal adjacency matrix $W_{Directional,Weighted}$ as shown in Eq. (8) above, and apply the mass flow balance principle as shown in Eq. (9) to reduce a number of unknown mass flow values.

Once the weighted diagonal adjacency matrix $W_{Directional,Weighted}$ is generated, the unknown mass flow value reducer 640 creates handle objects, for example, through object oriented programming for unknown mass flow values. Each row of this matrix can be parsed according to the following example.

Algorithm 2. Example pseudocode for mass propagation

```
for i = 1:size(W,1)
    Devices = W(i,:);
    Devices(Devices==0) = [ ];
    if numel(Devices) == 2
        if Devices(j−1) < 0
            Var1 = DeviceArray(Devices(j−1).Out);
        else
            Var1 = DeviceArray(Devices(j−1).In);
        end
        if Devices(j) < 0
            Var2 = DeviceArray(Devices(j).Out);
        else
            Var2 = DeviceArray(Devices(j).In);
        end
        Var1 = Var2;
    end
end
```

In this example, 'if numel(Devices)==2' statement causes mass flow reduction to be performed when a node is connected to a single input and a single output. Similarly to Algorithm 1 above, DeviceArray is a function to obtain a vector of unknown devices in a row of the weighted diagonal adjacency matrix $W_{Directional,Weighted}$. Var1 and Var2 are handle objects assigned to input mass flow values or output mass flow values of devices. Hence, for each row of the weighted diagonal adjacency matrix $W_{Directional,Weighted}$ (i.e., for each node), if a node is exactly connected to two devices, an unknown input mass flow value of a device and an unknown output mass flow value of the other device sharing the common node can be assigned to a common handle object. Referring to the example schematic representation 500 shown in FIG. 5, ten total input and output unknown mass flow values of five different devices (e.g., water pumps P1, P2, chillers P3, P4, and cold load P5) can be reduced to eight unknown mass flow values by assigning an output mass flow value of the water pump P1 and an input mass flow value of the chiller P3 to a single handle object and assigning an output mass flow value of the water pump P2 and an input mass flow value of the chiller P4 to another single handle object, based on the schematic arrangement indicated by the weighted diagonal adjacency matrix $W_{Directional,Weighted}$ and irrespective of the set of operating parameters of the devices.

The unknown mass flow value reducer 640 may further reduce a number of unknown mass flow values by applying known values (e.g., predetermined mass flow values or values derived based on a set of operating parameters) and propagating known values (i.e., obtaining additional known values) using the linear solver 660. In one approach, if a mass flow value is still unknown, the unknown mass flow value reducer 640 assigns a flag (e.g., Inf or NaN) indicating that such mass flow value is unknown. Moreover, the unknown mass flow value reducer 640 may generate a new weight matrix $C_m$:

$$C_m = isinf \begin{bmatrix} \widehat{u_1} & \cdots & 0 \\ \vdots & \ddots & \vdots \\ 0 & \cdots & \widehat{u_n} \end{bmatrix} \quad \text{Eq. (10)}$$

where isinf operator replaces any value of the matrix that is infinite as indicated by the flag with 1, and all other values become 0.

Based on the weight matrix $C_m$, the unknown mass flow value reducer 640 may generate a new weighted Laplacian matrix $L_2$ as shown below:

$$L_2 = A_{Out}^T C_{In,m} A_{Out} + A_{In}^T C_{Out,m} A_{In} \quad \text{Eq. (11)}$$

where $C_{In,m}$ may have a value of 1 when the weight matrix $C_m$ has a value of 1, and $C_{Out,m}$ may have a value of 1 when the weight matrix $C_m$ has a value of −1. A degrees matrix of the new weighted Laplacian matrix $L_2$ including diagonal elements of the new weighted Laplacian matrix $L_2$ indicates how many unknowns exist in the mass flow values. For example, a value of 1 of the degrees matrix indicates that the unknown mass flow value may be evaluated, and such unknown mass flow value may be computed by the linear solver 660. Referring to the example schematic representation 500 shown in FIG. 5, assuming that the input mass flow value of the water pump P1 is unknown, but the input mass flow value of the water pump P2 and the output mass of the cold load P5 are known, a first row of the new weighted Laplacian matrix $L_2(1,:)$ can be [1 1 0 0]. The unknown mass flow value reducer 640 may generate a list of unknown mass flow values remaining to be predicted by the non-linear solver 665.

The mass flow value predictor 645 receives the list of unknown mass flow values to be predicted, and obtains predicted mass flow values in the received list by the non-linear solver 665.

The unknown enthalpy value reducer 650 reduces a number of unknown enthalpy values to be predicted by the non-linear solver 665 based on the incidence matrix A, and generates a list of enthalpy values to be predicted by the non-linear solver 665. In one approach, the unknown enthalpy value reducer 650 exploits a property that all outputs have the same mix enthalpy. Hence, the mix enthalpy can be determined according to the following equation:

$$h_{mix} = \frac{\sum h_{in} m_{in}}{\sum m_{in}} \quad \text{Eq. (12)}$$

where $h_{mix}$ is a mix enthalpy value and $h_{in}$ is an input enthalpy value of a node. If the node includes only one input of the node and any number of outputs of the node, the mix enthalpy $h_{mix}$ becomes equal to the input enthalpy $h_{in}$. The unknown enthalpy value reducer 650 may obtain the weighted diagonal adjacency matrix $W_{Directional,Weighted}$ as shown in Eq. (8) above, and apply the enthalpy balance principle as shown in Eq. (12) to reduce a number of unknown enthalpy values.

Once the weighted diagonal adjacency matrix $W_{Directional,Weighted}$ is generated, the unknown enthalpy value reducer 650 creates handle objects, for example, through object oriented programming for unknown enthalpy values. Each row of this matrix can be parsed according to the following example.

---

Algorithm 3. Example pseudocode for enthalpy propagation

```
for i = 1:size(W,1)
    Devices = W(i,:);
    Devices(Devices==0) = [ ];
    for j = 2:numel(Devices)
        if numel (Devices(Devices<0)) ~= 1
            Devices(Devices<0)= [ ];
        end
        if Devices(j−1) < 0
            Var1 = DeviceArray(Devices(j−1).Out);
        else
            Var1 = DeviceArray(Devices(j−1).In);
        end
        if Devices(j) < 0
            Var2 = DeviceArray(Devices(j).Out);
        else
            Var2 = DeviceArray(Devices(j).In);
        end
        Var1 = Var2;
    end
end
```

---

In this example, enthalpy value reduction is performed when a node has exactly a single input and any number of outputs. Similarly to Algorithm 1 above, DeviceArray is a function to obtain a vector of unknown devices in a row of the weighted diagonal adjacency matrix $W_{Directional,Weighted}$. Var1 and Var2 are handle objects assigned to input enthalpy values or output enthalpy values of devices. Hence, for each row of the weighted diagonal adjacency matrix $W_{Directional,Weighted}$ (i.e., for each node), if a node has a single input and any number of outputs, an unknown output enthalpy value of a device corresponding to the input of the node and unknown input enthalpy values of other devices corresponding to outputs of the node can be assigned to a common handle object. Referring to the example schematic representation 500 shown in FIG. 5, ten total input and output unknown enthalpy values of five different devices (e.g., water pumps P1, P2, chillers P3, P4, and cold load P5) can be reduced to six unknown enthalpy values by (i) assigning output enthalpy value of the cold load P5 and input enthalpy values of the water pumps P1, P2 to a single handle object, (ii) assigning an output enthalpy value of the water pump P1 and an input enthalpy value of the chiller P3 to another single handle object, and (iii) assigning an output enthalpy value of the water pump P2 and an input enthalpy value of the chiller P4 to another single handle object, based on the schematic arrangement indicated by the weighted diagonal adjacency matrix $W_{Directional,Weighted}$ and irrespective of the set of operating parameters of the devices.

The unknown enthalpy value reducer 650 may further reduce a number of unknown enthalpy values by applying known values (e.g., predetermined enthalpy values or values derived based on a set of operating parameters) and propagating known values (i.e., obtaining additional known values) using the linear solver 660. In one approach, the unknown enthalpy value reducer 650 generates a new weight matrix $C_h$ similar to the weight matrix $C_m$ shown in Eq. (10). Based on the new weight matrix $C_h$, the unknown enthalpy value reducer 650 generates a new weighted Laplacian matrix $L_3$ as shown below:

$$L_3 = A_{In}^T C_{Out,h} A_{In} + A_{In}^T C_{Out,m} A_{In} + A_{Out}^T C_{In,h} A_{Out} \quad \text{Eq. (13)}$$

where $C_{In,h}$ may have a value of 1 when the weight matrix $C_h$ has a value of 1, and $C_{Out,h}$ may have a value of 1 when the weight matrix $C_h$ has a value of −1. The unknown enthalpy value reducer 650 may generate the new weighted Laplacian matrix $L_3$ after mass flow values $C_{Out,m}$ are obtained. A degrees matrix of the new weighted Laplacian matrix $L_3$ including diagonal elements of the new weighted Laplacian matrix $L_3$ indicates how many unknowns exist in the enthalpy values. For example, a value of 1 of the degrees matrix indicates that the unknown enthalpy value may be evaluated by the linear solver 660. The unknown enthalpy value reducer 650 then further reduces the number of unknown enthalpy values by propagating the known enthalpy values as indicated by the degrees matrix. The unknown enthalpy value reducer 650 may generate a list of unknown enthalpy values remaining to be predicted by the non-linear solver 665.

The enthalpy value predictor 655 receives the list of unknown enthalpy values to be predicted, and obtains predicted enthalpy values in the received list by the non-linear solver 665.

Advantageously, the state predictor 470 improves efficiency of predicting thermodynamic states of HVAC system at a plurality of nodes by reducing a number of computations performed by the non-linear solver 665. Assuming for an example, a central plant includes HVAC devices with total 208 unknowns. Of this large number of unknown values to be predicted, the disclosed state predictor 470 can eliminate 44 unknown pressure values, 13 unknown mass flow values, and 26 unknown enthalpy values based on the schematic connections of the HVAC devices. By assigning or propagating known values (e.g., input set points or predetermined operating state values), the disclosed state predictor 470 can eliminate additional 10 unknown enthalpy value. Hence, the state predictor 470 may reduce a number of unknown values to 115, allowing computations performed by the non-linear solver 665 with the computation reduction disclosed herein to be ⅓ of computations performed by the non-linear solver 665 without the computation reduction disclosed herein.

Figure 7:
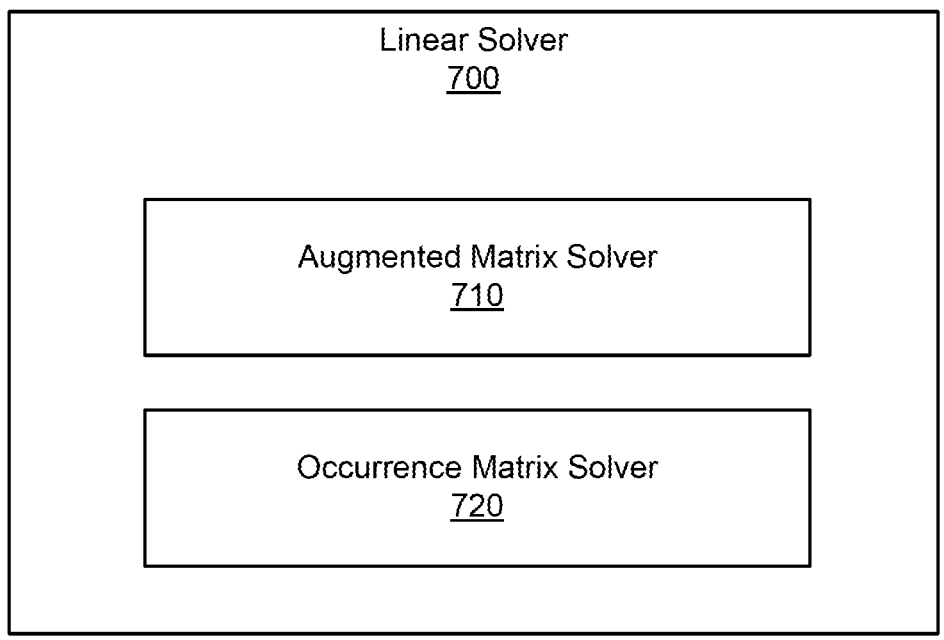
FIG. 7 is a block diagram of a linear solver, according to some embodiments.

FIG. 7 is a block diagram of a linear solver 700, according to some embodiments. The linear solver 700 may be the linear solver 660 of FIG. 6, or implemented as part of the unknown pressure value reducer 630, the unknown mass flow value reducer 640, and the unknown enthalpy value reducer 650 to reduce a number of unknown values through linear propagation of known values. In one aspect, the linear solver 700 includes the augmented matrix solver 710 and the occurrence matrix solver 720. In some embodiments, the linear solver 700 includes different, fewer, or additional components than shown in FIG. 7.

The augmented matrix solver 710 is a component that generates an augmented matrix indicating linear relationships of unknown thermodynamic states, and reduces a number of unknown thermodynamic states by propagating known thermodynamic states based on the augmented matrix. The augmented matrix solver 710 may generate the augmented matrix after or while reducing a number of thermodynamic states to be evaluated by the unknown pressure value reducer 630, the unknown mass flow value reducer 640, the unknown enthalpy value reducer 650, or a combination of them, according to the graph theory. For example, the augmented matrix solver 710 generates the augmented matrix based on the energy balance of a chiller as shown below:

Example Augmented Matrix (1)

| Chilled Water | | | | | | | Condenser Water | | | | | | | Elec. | | |
|---|---|---|---|---|---|---|---|---|---|---|---|---|---|---|---|---|
| Pin | Pout | Tin | Tout | Min | Mout | Q | Pin | Pout | Tin | Tout | Min | Mout | Q | W | b |
| 0 | 0 | 0 | 0 | 0 | 0 | 1 | 0 | 0 | 0 | 0 | 0 | 0 | −1 | 1 | 0 |

In the example augmented matrix above, the Condenser Water Q is the sum of the Chilled Water Q and the Electricity W, where the Condenser Water Q, the Chilled Water Q and the Electricity W are unknown. When two of the unknowns are found, the augmented matrix solver 710 may obtain a value of the other.

In one aspect, the augmented matrix solver 710 reduces a large system of equations as indicated by the augmented matrix through a PLU factorization. Specifically, the augmented matrix solver 710 generates a lower triangular matrix, upper triangular matrix, and permutation matrix according to the following equation:

$$G = PLU \quad \text{Eq. (14)}$$

where G is an augmented matrix, P is a permutation matrix, L is a lower triangular matrix, and U is an upper triangular matrix. In one aspect, the augmented matrix is an s by t matrix, where s is a number of rows corresponding to a number of linear equations and t is a number of columns corresponding to a number of unknowns to be solved. The number of rows s may be less than a number of columns t because of a number of non-linear equations. Hence, a traditional Gaussian Elimination may not be applicable.

After the PLU factorization, the augmented matrix solver 710 may compute unknown thermodynamic states of the HVAC system through backwards and forwards substitution, as shown below:

$$Gx = PLUx = b, \text{ or } x = U^{-1}(L^{-1}(P^{-1}b)) \quad \text{Eq. (15)}$$

where x may be a matrix including a list of unknown thermodynamic states to be predicted, and b may be a matrix including a list of target error values or setpoints. Due to the form of the permutation matrix, $P^{-1}$ is equivalent to $P^T$, hence $P^{-1}$ can be easily obtained. $L^{-1}$ and $U^{-1}$ can be obtained through backwards and forwards substitution algorithm.

Advantageously, PLU factorization performed by the augmented matrix solver 710 improves computation efficiency. In one aspect, the PLU factorization is independent of b, thus the augmented matrix solver 710 can perform PLU factorization once for a single set of equations, regardless of b or any change in b. In addition, the permutation matrix P can be created containing rows in sequential order that they can be computed. Hence, a search algorithm to identify solvable rows in the augmented matrix may be omitted.

The occurrence matrix solver 720 is a component that generates an occurrence matrix indicating non-linear relationships of unknown thermodynamic states, and reduces a number of unknown thermodynamic states by propagating known thermodynamic states based on the occurrence matrix. The occurrence matrix solver 720 may generate the occurrence matrix after or while reducing a number of thermodynamic states to be evaluated by the unknown pressure value reducer 630, the unknown mass flow value reducer 640, the unknown enthalpy value reducer 650, or a combination of them, according to the graph theory. The occurrence matrix solver 720 may generate the occurrence matrix after the augmented matrix solver 710 reduces a number of unknown values. For example, the occurrence matrix solver 720 generates a non-linear error equation below based on thermal energy load.

$$Q = m_{in} c_p (T_{In} - T_{Out}) \quad \text{Eq. (16)}$$

$$(1 \ 1 \ 1 \ 0 \ 1) \begin{pmatrix} T_{In} \\ T_{Out} \\ m_{in} \\ m_{out} \\ Q \end{pmatrix} \quad \text{Eq. (17)}$$

The occurrence matrix solver 720 may propagate known values obtained by the augmented matrix solver 710 to reduce a number of unknown values based on the occurrence matrix. Accordingly, the non-linear solver 665 may predict a fewer number of unknown values.

Figure 8:
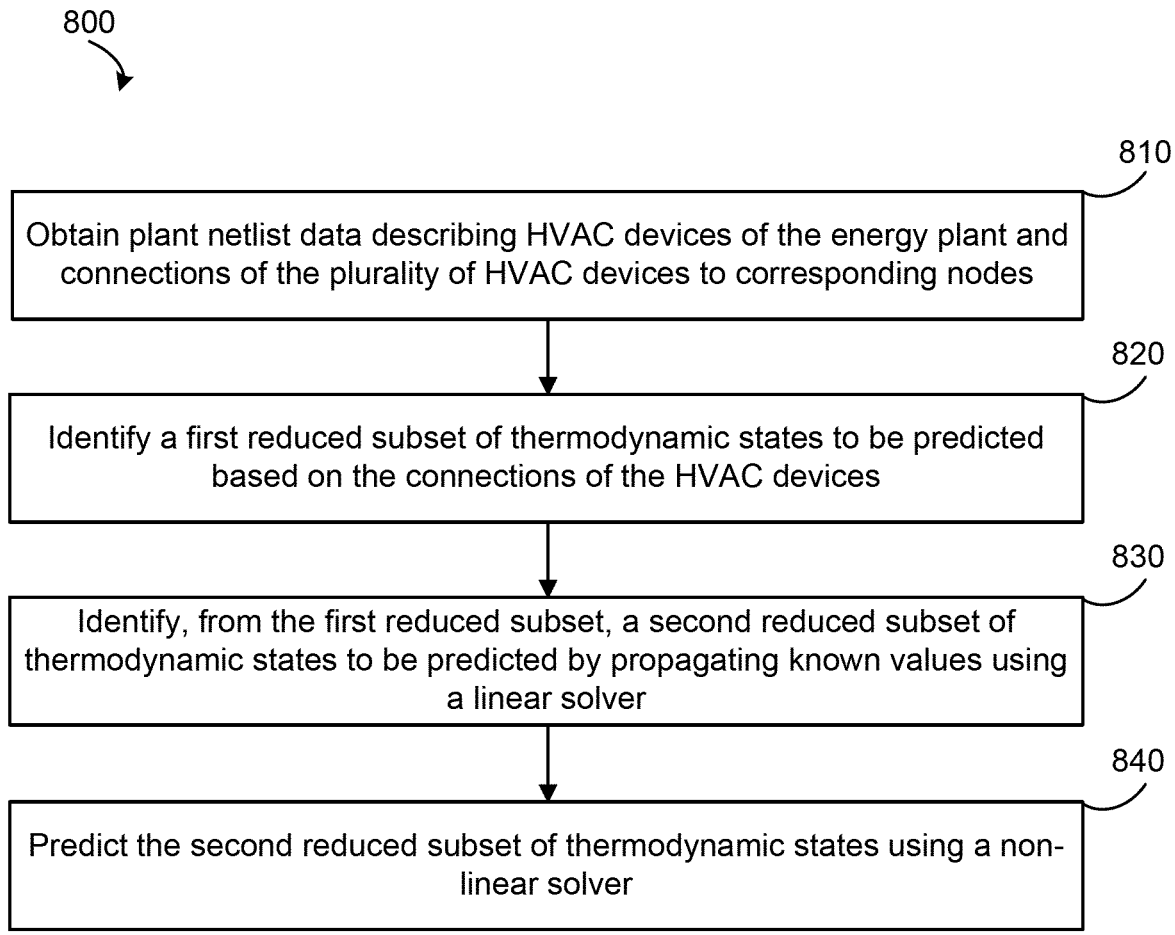
FIG. 8 is a flow chart illustrating a process for predicting thermodynamic states at various locations within the HVAC system through computation reduction based on a linear solver, according to some embodiments.

FIG. 8 is a flow chart illustrating a process for predicting thermodynamic states at various locations within the HVAC system through computation reduction based on a linear solver, according to some embodiments. The process 800 may be performed by the low level optimizer 450 of FIG. 4. In some embodiments, the process 800 may be performed by other entities. In some embodiments, the process 800 may include additional, fewer, or different steps than shown in FIG. 8.

The low level optimizer 450 obtains plant netlist data describing HVAC devices of the energy plant and connections of the plurality of HVAC devices to corresponding nodes (step 810). The low level optimizer 450 identifies a first reduced subset of thermodynamic states to be predicted based on the connections of the HVAC devices (step 820). For example, the low level optimizer 450 obtains the first reduced subset of thermodynamic states through graph theory based on energy, mass, and momentum balance. The low level optimizer 450 identifies, from the first reduced subset, a second reduced subset of thermodynamic states to be predicted by propagating known values of thermodynamic states (step 830). In one approach, the low level optimizer 450 may apply target setpoints, or other values derived from the target setpoints to the linear solver to obtain additional know values of the thermodynamic states to reduce a number of unknown values in the first reduced subset. The second reduced subset of thermodynamic states may comprise remaining unknown values from the first reduced subset, and exclude predicted values from the first reduced subset. The low level optimizer 450 predicts the second reduced subset of thermodynamic states using a non-linear solver (step 840). The non-linear solver may be applied to predict unknown values of thermodynamic states in the second reduced subset, rather the full set of thermodynamic states.

Figure 9:
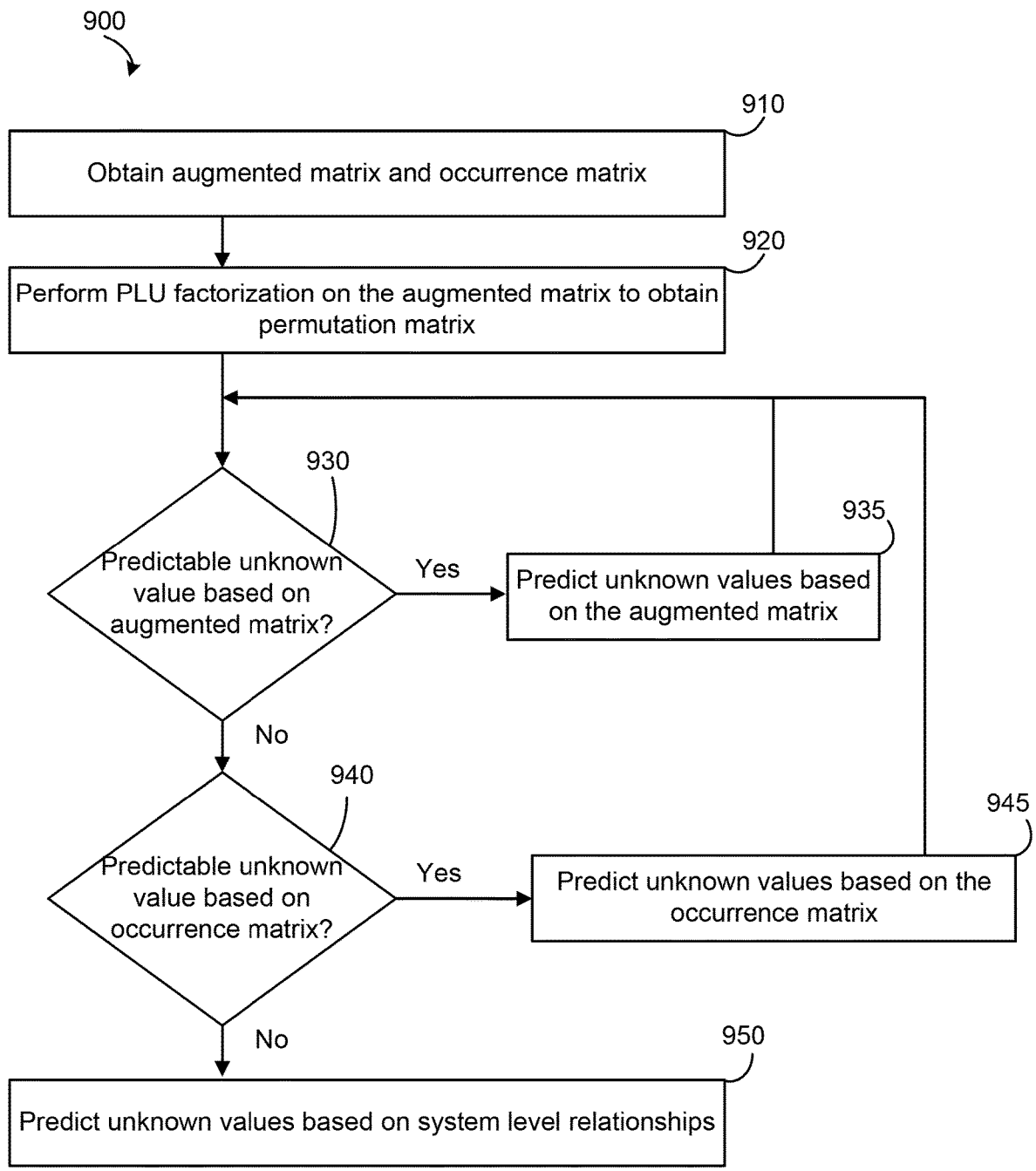
FIG. 9 is a flow chart illustrating a process for identifying a reduced subset of thermodynamic states within the HVAC system to be predicted by the non-linear solver through linear propagation, according to some embodiments.

FIG. 9 is a flow chart illustrating a process for identifying a reduced subset of thermodynamic states within the HVAC system to be predicted by the non-linear solver through linear propagation, according to some embodiments. The process 900 may be performed by the linear solver 700 of FIG. 7. In some embodiments, the process 900 may be performed by other entities. In some embodiments, the process 900 may include additional, fewer, or different steps than shown in FIG. 7.

The linear solver 700 obtains augmented matrix indicating linear relationships of unknown values to be predicted and occurrence matrix indicating non-linear relationships of the unknown values (step 910). The linear solver 700 may generate the augmented matrix and the occurrence matrix based on unknown values of thermodynamic states of the HVAC system after a reduction through graph theory. The linear solver 700 performs PLU factorization on the augmented matrix to obtain permutation matrix (step 920). The permutation matrix may indicate a sequential order of unknown values to be computed.

The linear solver 700 determines if a predictable unknown value based on the augmented matrix exists (step 930). If at least one unknown value is predictable based on the augmented matrix, the linear solver 700 predicts one or more unknown values by propagating known values (e.g., known setpoints) to obtain additional known values to reduce a number of unknown values based on the augmented matrix, for example, through PLU factorization (step 935). After obtaining one or more additional known values based on the augmented matrix, the linear solver 700 may return to step 930 to determine if an additional unknown value is predictable based on the augmented matrix.

Assuming that a Chilled Water Q is found to be 500 in the example augmented matrix (1) above, the linear solver 700 may update values to obtain the following augmented matrix:

Example Augmented Matrix (2)

| Chilled Water | | | | | | | Condenser Water | | | | | | | Elec. | | |
|---|---|---|---|---|---|---|---|---|---|---|---|---|---|---|---|---|
| Pin | Pout | Tin | Tout | Min | Mout | Q | Pin | Pout | Tin | Tout | Min | Mout | Q | W | b |
| 0 | 0 | 0 | 0 | 0 | 0 | 0 | 0 | 0 | 0 | 0 | 0 | 0 | −1 | 1 | −500 |

Further assuming that the Electrical work W is found to be 100, the linear solver 700 may update values to obtain the following augmented matrix:

Example Augmented Matrix (3)

| Chilled Water | | | | | | | Condenser Water | | | | | | | Elec. | |
|---|---|---|---|---|---|---|---|---|---|---|---|---|---|---|---|
| Pin | Pout | Tin | Tout | Min | Mout | Q | Pin | Pout | Tin | Tout | Min | Mout | Q | W | b |
| 0 | 0 | 0 | 0 | 0 | 0 | 0 | 0 | 0 | 0 | 0 | 0 | 0 | −1 | 0 | −600 |

Through iterative computation, the linear solver 700 determines that the example augmented matrix (3) has a single unknown Condenser Water Q, because the example augmented matrix (3) has a single entry for the Condenser Water Q. Hence, the linear solver 700 can determine that a value of the Condenser Water Q to be 600.

Responsive to determining that no remaining one of the unknown values is predictable based on the augmented matrix, the linear solver 700 determines if a predictable unknown value based on the occurrence matrix exists (step 940). If at least one unknown value is predictable based on the occurrence matrix, the linear solver 700 predicts one or more unknown values by propagating known values (e.g., known setpoints) to obtain additional known values to further reduce a number of unknown values through the occurrence matrix (step 945). After obtaining one or more additional known values based on the occurrence matrix, the linear solver 700 may return to step 930 to determine if an additional unknown value is predictable based on the augmented matrix.

In one aspect, the occurrence matrix indicates which unknowns are found in an equation. These unknowns may be indexed identically to the X vector, so the X vector may be applied to each row of the occurrence matrix. An unknown value in the occurrence matrix may be indicated by a flag (e.g., "inf"), thus a row containing more than one flag can be determined to be unsolvable. If there is a single flag in the row, the linear solver 700 may compute the single unknown value in the occurrence matrix.

Responsive to determining that no remaining one of the unknown values is predictable based on the occurrence matrix, the linear solver 700 predicts one or more unknown values remaining from the step 940 (step 950) based on system level relationships. For example, the linear solver 700 predicts one or more unknown values based on schematic connections of the HVAC devices and energy, mass, and momentum balance principles as described above. Unknown values remaining after the step 950 can be predicted by the non-linear solver 665. Accordingly, a reduced number of unknown values of thermodynamic states of HVAC system are predicted by the expensive non-linear solver 665, rather than predicting the full set of unknown values by the non-linear solver 665. Hence, computation resource for predicting thermodynamic states of the HVAC system can be substantially reduced (e.g., 1/10 or less) compared to a conventional approach of predicting thermodynamic states of the HVAC system without the disclosed computation reduction.

Figure 10:
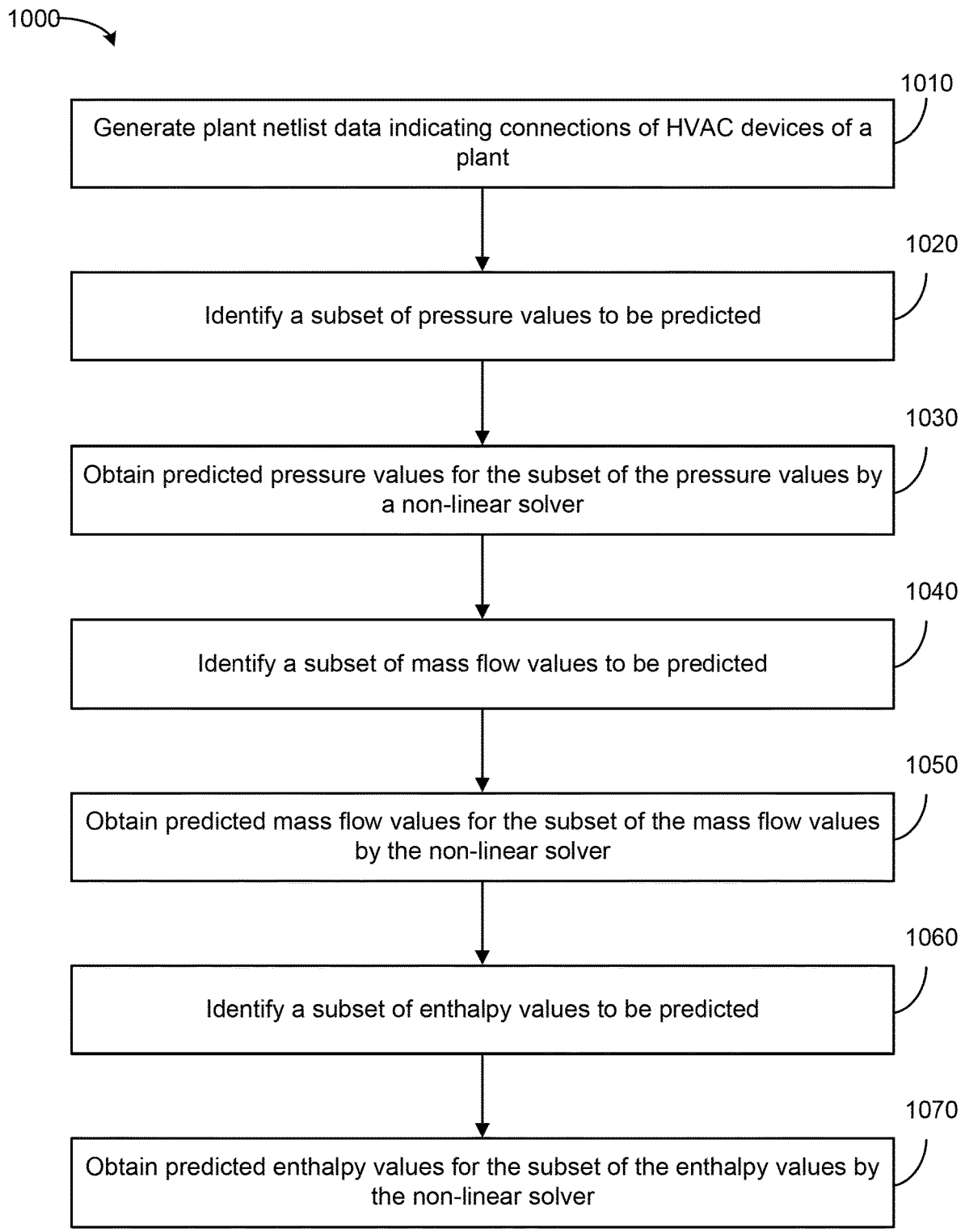
FIG. 10 is a flow chart illustrating a process for predicting thermodynamic states at various locations within the HVAC system through computation reduction based on graph theory, according to some embodiments.

Referring to FIG. 10, illustrated is a flow chart of a process 1000 of predicting thermodynamic states of the HVAC system at a plurality of nodes through computation reduction based on graph theory, according to some embodiments. The process 1000 may be performed by the low level optimizer 450 of FIG. 4. In some embodiments, the process 1000 may be performed by other entities. In some embodiments, the process 1000 may include additional, fewer, or different steps than shown in FIG. 10.

The low level optimizer 450 generates plant netlist data indicating schematic connections of HVAC devices of a plant e.g., HVAC system 100 (step 1010). The low level optimizer 450 may automatically generate the plant netlist data based on a user input through a graphical interface or manually input through a text editor. In some embodiments, other components separate from the low level optimizer 450 may generate the plant netlist data.

The low level optimizer 450 receives the plant netlist data, and identifies, from a plurality of pressure values of the HVAC devices, a subset of the plurality of pressure values to be predicted by a non-linear solver (step 1020). By the non-linear solver, the low level optimizer 450 obtains predicted pressure values for the identified subset of the plurality of pressure values (step 1030).

The low level optimizer 450 identifies, from a plurality of mass flow values of the HVAC devices, a subset of the plurality of mass flow values to be predicted by the non-linear solver (step 1040). By the non-linear solver, the low level optimizer 450 obtains predicted mass flow values for the identified subset of the plurality of mass flow values (step 1050).

The low level optimizer 450 identifies, from a plurality of enthalpy values of the HVAC devices, a subset of the plurality of enthalpy values to be predicted by the non-linear solver (step 1060). By the non-linear solver, the low level optimizer 450 obtains predicted enthalpy values for the identified subset of the plurality of enthalpy values (step 1070).

Figure 11:
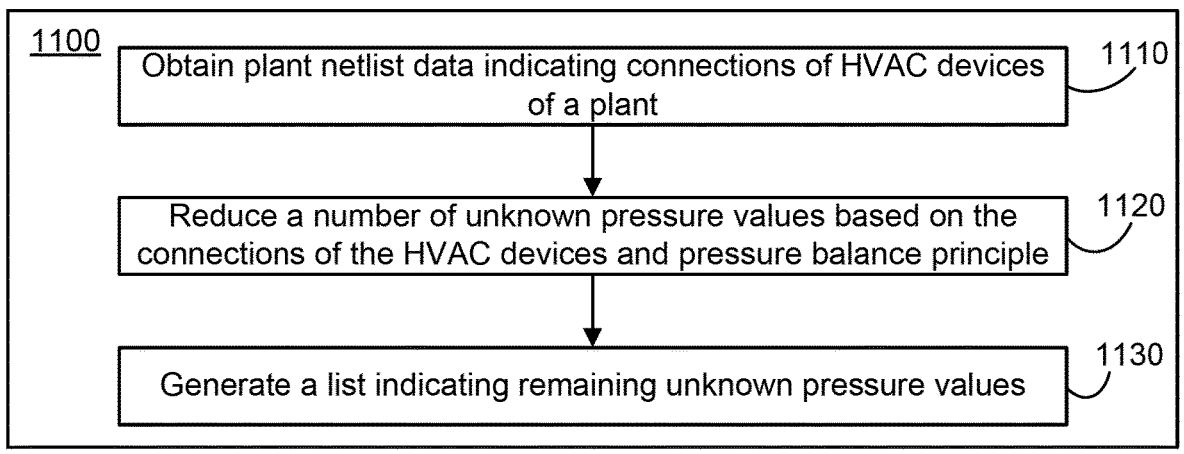
FIG. 11 is a flow chart illustrating a process for reducing, through computation reduction based on graph theory, a number of pressure values to be predicted, according to some embodiments.

Referring to FIG. 11, illustrated is a flow chart illustrating a process 1100 of reducing, through computation reduction based on graph theory, a number of pressure values to be predicted, according to some embodiments. The process 1100 may be performed by the unknown pressure value reducer 630 or a combination of the incidence matrix generator 620 and the unknown pressure value reducer 630 of FIG. 6. In some embodiments, the process 1100 may be performed by other entities. In some embodiments, the process 1100 may include additional, fewer, or different steps than shown in FIG. 11.

The incidence matrix generator 620 obtains plant netlist data indicating connections of the HVAC devices of the plant (step 1110).

The unknown pressure value reducer 630 reduces, based on the connections of the HVAC devices indicated by the plant netlist data, a number of unknown pressure values to be predicted (step 1120). In one approach, the incidence matrix generator 620 generates an incidence matrix A based on the netlist data, for example, as shown in Eq. (5). The unknown pressure value reducer 630 may obtain the weighted Laplacian matrix $L_1$ based on the incidence matrix A according to Eq. (7), and further obtain weighted diagonal adjacency matrix $W_{Directional,Weighted}$ by subtracting the weighted Laplacian matrix $L_1$ from a degrees matrix $D_1$ including diagonal elements of the weighted Laplacian matrix $L_1$. Moreover, the unknown pressure value reducer 630 may generate handle objects, for example, through object oriented programming unknown pressure values based on pressure balance principle as shown in Algorithm 1. The unknown pressure value reducer 630 may further reduce a number of unknown pressure values by applying known values (e.g., predetermined pressure values or values derived based on a set of operating parameters) and propagating known values (i.e., obtaining additional known values) using the linear solver 660.

The unknown pressure value reducer 630 generates a list indicating remaining unknown pressure values from the previous steps (step 1130).

Figure 12:
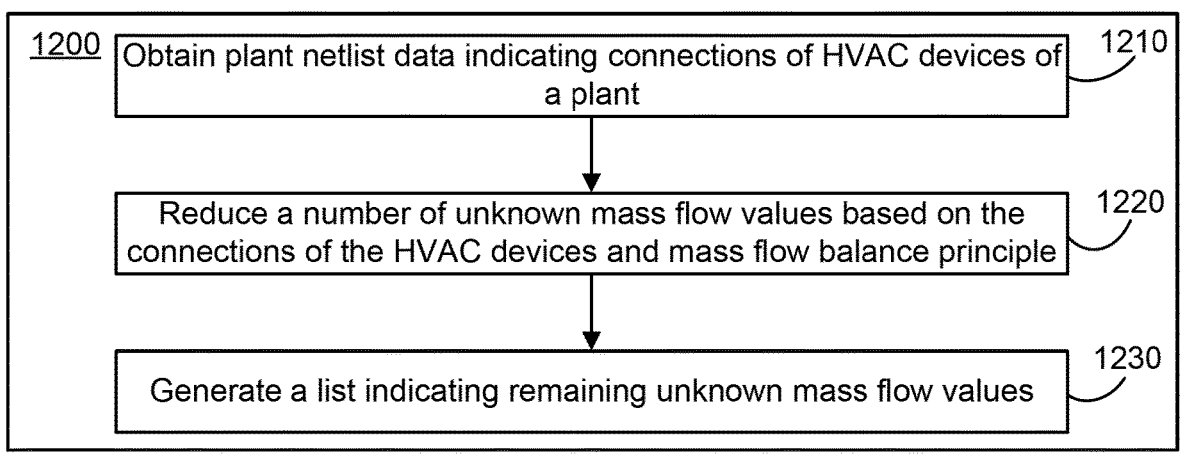
FIG. 12 is a flow chart illustrating a process for reducing, through computation reduction based on graph theory, a number of mass flow values to be predicted, according to some embodiments.

Referring to FIG. 12, illustrated is a flow chart of the process 1200 of reducing, through computation reduction based on graph theory, a number of mass flow values to be predicted, according to some embodiments. The process 1200 may be performed by the unknown mass flow value reducer 640 or a combination of the incidence matrix generator 620 and the unknown mass flow value reducer 640 of FIG. 6. In some embodiments, the process 1200 may be performed by other entities. In some embodiments, the process 1200 may include additional, fewer, or different steps than shown in FIG. 12.

The incidence matrix generator 620 obtains plant netlist data indicating connections of the HVAC devices of the plant (step 1210).

The unknown mass flow value reducer 640 reduces, based on the connections of the HVAC devices indicated by the plant netlist data, a number of unknown mass flow values to be predicted (step 1220). In one approach, the unknown mass flow value reducer 640 may obtain weighted diagonal adjacency matrix $W_{Directional,Weighted}$, as noted above. Moreover, the unknown mass flow value reducer 640 may generate handle objects, for example, through object oriented programming for unknown mass flow values based on mass flow balance principle as shown in Algorithm 2. The unknown mass flow value reducer 640 may further reduce a number of unknown mass flow values by generating weight matrix $C_m$ and a new weighted Laplacian matrix $L_2$ according to Eq. (10) and Eq. (11). In addition, the unknown mass flow value reducer 640 may further obtain a degrees matrix of the new weighted Laplacian matrix $L_2$ indicating how many unknowns are in the mass flow values. Moreover, the unknown mass flow value reducer 640 may further reduce a number of unknown mass flow values based on the degrees matrix by propagating known values (i.e., obtaining additional known values) using the linear solver 660.

The unknown mass flow value reducer 640 generates a list indicating remaining unknown mass flow values from the previous steps (step 1230).

Figure 13:
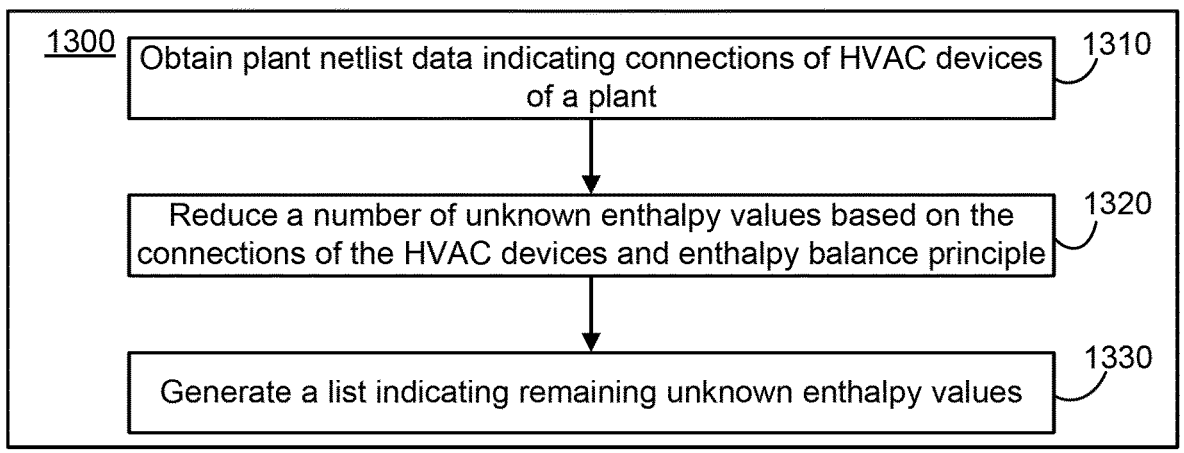
FIG. 13 is a flow chart illustrating a process for reducing, through computation reduction based on graph theory, a number of enthalpy values to be predicted, according to some embodiments.

Referring to FIG. 13, illustrated is a flow chart of the process 1300 of reducing, through computation reduction based on graph theory, a number of enthalpy values to be predicted, according to some embodiments. The process 1300 may be performed by the unknown enthalpy value reducer 650 or a combination of the incidence matrix generator 620 and the unknown enthalpy value reducer 650 of FIG. 6. In some embodiments, the process 1300 may be performed by other entities. In some embodiments, the process 1300 may include additional, fewer, or different steps than shown in FIG. 13.

The incidence matrix generator 620 obtains plant netlist data indicating connections of the HVAC devices of the plant (step 1310).

The unknown enthalpy value reducer 650 reduces, based on the connections of the HVAC devices indicated by the plant netlist data, a number of unknown enthalpy values to be predicted (step 1320). Preferably, the step 1320 is performed after mass flow values are known. In one approach, the unknown enthalpy value reducer 650 may obtain weighted diagonal adjacency matrix $W_{Directional,Weighted}$, as noted above. Moreover, the unknown enthalpy value reducer 650 may generate handle objects, for example, through object oriented programming for unknown enthalpy values based on enthalpy balance principle as shown in Algorithm 3. The unknown enthalpy value reducer 650 may further reduce a number of unknown enthalpy values by generating weight matrix $C_h$ and a new weighted Laplacian matrix $L_3$ according to Eq. (13). In addition, the unknown enthalpy value reducer 650 may further obtain a degrees matrix of the new weighted Laplacian matrix $L_3$ indicating how many unknowns are in the enthalpy values. Moreover, the unknown enthalpy value reducer 650 may further reduce a number of unknown enthalpy values based on the degrees matrix by propagating known values (i.e., obtaining additional known values) using the linear solver 660.

The unknown enthalpy value reducer 650 generates a list indicating remaining unknown enthalpy values from the previous steps (step 1330).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for an energy plant, the controller comprising:
    a processing circuit comprising a processor and memory storing instructions executed by the processor, the processing circuit configured to:
        obtain plant netlist data describing a plurality of heat, ventilation, and air conditioning (HVAC) devices of the energy plant and connections of the plurality of HVAC devices to corresponding nodes, each HVAC device configured to operate according to a corresponding operating parameter,
        identify, from a plurality of thermodynamic states of the energy plant at a plurality of nodes, a first reduced subset of the plurality of thermodynamic states to be predicted based on the connections of the plurality of HVAC devices,
        identify, from the first reduced subset, a second reduced subset of the plurality of thermodynamic states to be predicted by propagating a known value of the plurality of thermodynamic states using a linear solver,
        predict the second reduced subset of the plurality of thermodynamic states using a non-linear solver,
        determine the plurality of thermodynamic states of the energy plant at the plurality of nodes based on the predicted second reduced subset of the plurality of thermodynamic states,
        determine a set of operating parameters of the plurality of HVAC devices based on the plurality of thermodynamic states of the energy plant at the plurality of nodes, and
        operate the plurality of HVAC devices according to the set of operating parameters.

2. The controller of claim 1, wherein the processing circuit is configured to:
    generate an incidence matrix indicating the connections of the plurality of HVAC devices,
    obtain an augmented matrix indicating linear relationships of the first reduced subset of the plurality of thermodynamic states, and
    obtain an occurrence matrix indicating non-linear relationships of the first reduced subset of the plurality of thermodynamic states.

3. The controller of claim 2, wherein a row of the augmented matrix corresponds to a number of the linear relationships and a column of the augmented matrix corresponds to a corresponding unknown value of the first reduced subset of the plurality of thermodynamic states.

4. The controller of claim 3, wherein the processing circuit is configured to:
    perform a PLU factorization on the incidence matrix to obtain a permutation matrix of the incidence matrix, the permutation matrix indicating rows in a sequential order to be solved by the linear solver, and
    determine whether at least one of the first reduced subset of the plurality of thermodynamic states is predictable using the linear solver based on the augmented matrix.

5. The controller of claim 4, wherein the processing circuit is configured to:
    predict a predictable unknown value of the first reduced subset of the plurality of thermodynamic states using the linear solver, in response to determining that the at least one of the first reduced subset of the plurality of thermodynamic states is predictable based on the augmented matrix, and
    determine whether an additional one of the first reduced subset of the plurality of thermodynamic states is predictable using the linear solver based on the augmented matrix.

6. The controller of claim 4, wherein the processing circuit is configured to:
    determine whether at least one of the first reduced subset of the plurality of thermodynamic states is predictable using the linear solver based on the occurrence matrix, in response to determining that no remaining unknown value of the first reduced subset of the plurality of thermodynamic states is predictable based on the augmented matrix.

7. The controller of claim 6, wherein the processing circuit is configured to:
    predict a predictable unknown value of the first reduced subset of the plurality of thermodynamic states using the linear solver, in response to determining that the at least one of the first reduced subset of the plurality of thermodynamic states is predictable based on the occurrence matrix, and
    determine whether an additional one of the first reduced subset of the plurality of thermodynamic states is predictable using the linear solver based on the augmented matrix.

8. The controller of claim 6, wherein the processing circuit is configured to:
    predict an unknown value of the first reduced subset of the plurality of thermodynamic states based on system level relationships of the plurality of HVAC devices, the second reduced subset comprising remaining unknown values of the first reduced subset of the plurality of thermodynamic states and excluding predicted values of the first reduced subset.

9. The controller of claim 1, wherein the second reduced subset of the plurality of thermodynamic states is iteratively predicted by propagating the known value of the plurality of thermodynamic states using the linear solver.

10. A non-transitory computer readable medium storing instructions to operate an energy plant, the instructions when executed by one or more processors cause the one or more processors to:
    obtain plant netlist data describing a plurality of heat, ventilation, and air conditioning (HVAC) devices of the energy plant and connections of the plurality of HVAC devices to corresponding nodes, each HVAC device configured to operate according to a corresponding operating parameter;
    identify, from a plurality of thermodynamic states of the energy plant at a plurality of nodes, a first reduced subset of the plurality of thermodynamic states to be predicted based on the connections of the plurality of HVAC devices;

identify, from the first reduced subset, a second reduced subset of the plurality of thermodynamic states to be predicted by propagating a known value of the plurality of thermodynamic states using a linear solver;

predict the second reduced subset of the plurality of thermodynamic states using a non-linear solver;

determine the plurality of thermodynamic states of the energy plant at the plurality of nodes based on the predicted second reduced subset of the plurality of thermodynamic states;

determine a set of operating parameters of the plurality of HVAC devices based on the plurality of thermodynamic states of the energy plant at the plurality of nodes; and operate the plurality of HVAC devices according to the set of operating parameters.

11. The non-transitory computer readable medium of claim 10, further comprising instructions when executed by the one or more processors cause the one or more processors to:

generate an incidence matrix indicating the connections of the plurality of HVAC devices;

obtain an augmented matrix indicating linear relationships of the first reduced subset of the plurality of thermodynamic states; and obtain an occurrence matrix indicating non-linear relationships of the first reduced subset of the plurality of thermodynamic states.

12. The non-transitory computer readable medium of claim 11, wherein a row of the augmented matrix corresponds to a number of the linear relationships and a column of the augmented matrix corresponds to a corresponding unknown value of the first reduced subset of the plurality of thermodynamic states.

13. The non-transitory computer readable medium of claim 12, further comprising instructions when executed by the one or more processors cause the one or more processors to:

perform a PLU factorization on the incidence matrix to obtain a permutation matrix of the incidence matrix, the permutation matrix indicating rows in a sequential order to be solved by the linear solver; and determine whether at least one of the first reduced subset of the plurality of thermodynamic states is predictable using the linear solver based on the augmented matrix.

14. The non-transitory computer readable medium of claim 13, further comprising instructions when executed by the one or more processors cause the one or more processors to:

predict a predictable unknown value of the first reduced subset of the plurality of thermodynamic states using the linear solver, in response to determining that the at least one of the first reduced subset of the plurality of thermodynamic states is predictable based on the augmented matrix; and determine whether an additional one of the first reduced subset of the plurality of thermodynamic states is predictable using the linear solver based on the augmented matrix.

15. The non-transitory computer readable medium of claim 14, further comprising instructions when executed by the one or more processors cause the one or more processors to:

determine whether at least one of the first reduced subset of the plurality of thermodynamic states is predictable using the linear solver based on the occurrence matrix, in response to determining that no remaining one of the first reduced subset of the plurality of thermodynamic states is predictable based on the augmented matrix.

16. The non-transitory computer readable medium of claim 15, further comprising instructions when executed by the one or more processors cause the one or more processors to:

predict a predictable unknown value of the first reduced subset of the plurality of thermodynamic states using the linear solver, in response to determining that the at least one of the first reduced subset of the plurality of thermodynamic states is predictable based on the occurrence matrix; and determine whether an additional one of the first reduced subset of the plurality of thermodynamic states is predictable using the linear solver based on the augmented matrix.

17. The non-transitory computer readable medium of claim 15, further comprising instructions when executed by the one or more processors cause the one or more processors to:

predict an unknown value of the first reduced subset of the plurality of thermodynamic states based on system level relationships of the plurality of HVAC devices, the second reduced subset comprising remaining unknown values of the first reduced subset of the plurality of thermodynamic states and excluding predicted values of the first reduced subset.

18. The non-transitory computer readable medium of claim 10, wherein the second reduced subset of the plurality of thermodynamic states is iteratively predicted by propagating the known value of the plurality of thermodynamic states using the linear solver.

19. A non-transitory computer readable medium storing instructions to predict a plurality of thermodynamic states of an energy plant at a plurality of nodes, the instructions when executed by one or more processors cause the one or more processors to:

obtain plant netlist data describing a plurality of heat, ventilation, and air conditioning (HVAC) devices of the energy plant and connections of the plurality of HVAC devices to corresponding nodes, each HVAC device configured to operate according to a corresponding operating parameter;

identify, from the plurality of thermodynamic states of the energy plant at the plurality of nodes, a first reduced subset of the plurality of thermodynamic states to be predicted based on the connections of the plurality of HVAC devices;

identify, from the first reduced subset, a second reduced subset of the plurality of thermodynamic states to be predicted by propagating a known value of the plurality of thermodynamic states using a linear solver;

predict the second reduced subset of the plurality of thermodynamic states using a non-linear solver; and determine the plurality of thermodynamic states of the energy plant at the plurality of nodes based on the predicted second reduced subset of the plurality of thermodynamic states.

20. The non-transitory computer readable medium of claim 19, further comprising instructions when executed by the one or more processors cause the one or more processors to:

generate an incidence matrix indicating the connections of the plurality of HVAC devices;
obtain an augmented matrix indicating linear relationships of the first reduced subset of the plurality of thermodynamic states; and
obtain an occurrence matrix indicating non-linear relationships of the first reduced subset of the plurality of thermodynamic states.

* * * * *